United States Patent
Mooney et al.

(10) Patent No.: US 11,625,372 B1
(45) Date of Patent: *Apr. 11, 2023

(54) SYSTEMS AND METHODS FOR DATA QUALITY CERTIFICATION

(71) Applicant: Wells Fargo Bank, N.A., San Francisco, CA (US)

(72) Inventors: Nadine Mooney, Denver, CO (US); Holly Angevine, Charlotte, NC (US); Elizabeth Hinshaw, Charlotte, NC (US); Richard Welsh, Charlotte, NC (US); Raziq Yaqub, Stewartsville, NJ (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/658,239

(22) Filed: Apr. 6, 2022

Related U.S. Application Data

(63) Continuation of application No. 15/881,122, filed on Jan. 26, 2018, now Pat. No. 11,321,286.

(51) Int. Cl.
  G06F 16/215 (2019.01)
  G06F 16/28 (2019.01)
  G06F 16/23 (2019.01)

(52) U.S. Cl.
  CPC ........ *G06F 16/215* (2019.01); *G06F 16/2365* (2019.01); *G06F 16/285* (2019.01)

(58) Field of Classification Search
  CPC ... G06F 16/215; G06F 16/2365; G06F 16/285
  See application file for complete search history.

(56) References Cited

U.S. PATENT DOCUMENTS 8,176,523 B2   5/2012   Kortum et al.
8,612,936 B2   12/2013  Fox et al.
(Continued)

OTHER PUBLICATIONS

Siljak et al. "Measurement of Data Quality in the Case of Short Term Statistics." European Conference on Quality and Methodology in Official Statistics (Q2004), Mainz, Germany, 12 pages.
(Continued)

*Primary Examiner* — Kris E Mackes
(74) *Attorney, Agent, or Firm* — Womble Bond Dickinson (US) LLP

(57) ABSTRACT

Systems, apparatuses, methods, and computer program products are disclosed for categorizing a data set. An example method includes receiving first electronic information comprising objective indicia of quality associated with the data set and second electronic information comprising subjective indicia of quality associated with the data set. The example method further includes generating third electronic information comprising analytical indicia of quality associated with the data set based on the first electronic information and the second electronic information. The example method further includes generating a data quality rating for the data set based on the first electronic information, the second electronic information, and the third electronic information. Subsequently, the example method includes generating a data quality categorization for the data set based on the data quality rating.

20 Claims, 9 Drawing Sheets

(56) References Cited

U.S. PATENT DOCUMENTS

| | | |
|---|---|---|
| 8,665,108 B2 | 3/2014 | Akimov et al. |
| 8,984,360 B2 | 3/2015 | Al Za'noun et al. |
| 10,223,637 B1 | 3/2019 | Czuba et al. |
| 2007/0078675 A1 | 4/2007 | Kaplan |
| 2007/0106577 A1 | 5/2007 | Kopp et al. |
| 2008/0263096 A1 | 10/2008 | Klein et al. |
| 2011/0173191 A1 | 7/2011 | Tsaparas et al. |
| 2013/0166374 A1* | 6/2013 | Capuozzo .......... G06Q 30/0276 705/14.43 |
| 2017/0103472 A1 | 4/2017 | Shah |
| 2017/0109838 A1 | 4/2017 | Byron et al. |
| 2018/0189913 A1 | 7/2018 | Knopp et al. |
| 2019/0079971 A1 | 3/2019 | Danyluk et al. |

OTHER PUBLICATIONS

Open Data Institute, "Certificate Badge Levels," [retrieved Sep. 13, 2017] Retrieved from the Internet: <URL: https://certificates.theodi.org/en/about/badgelevels) (undated) 2 pages.

* cited by examiner

SYSTEMS AND METHODS FOR DATA QUALITY CERTIFICATION

CROSS-REFERENCE TO RELATED APPLICATIONS

This application is a continuation of U.S. patent application Ser. No. 15/881,122, filed Jan. 26, 2018, the entire contents of which are incorporated herein by reference.

TECHNOLOGICAL FIELD

Example embodiments of the present disclosure relate generally to data management and, more particularly, to systems and methods for data quality certification.

BACKGROUND

The inventors have discovered problems with existing mechanisms for data quality certification. Through applied effort, ingenuity, and innovation, the inventors has solved many of these identified problems by developing solutions embodied by the present disclosure and described in detail below.

BRIEF SUMMARY

Systems, apparatuses, methods, and computer program products are disclosed herein for categorizing data sets. The data certification system provided herein solves the above problems by evaluating the quality of a data set based on objective indicia of quality, subjective indicia of quality, and in some embodiments, analytical indicia of quality derived from the objective indicia, the subjective indicia, or both.

In one example embodiment, a computing system is provided for categorizing a data set. The computing system may comprise data quality analysis (DQA) circuitry configured to receive first electronic information comprising objective indicia of quality associated with the data set. The DQA circuitry may be further configured to receive second electronic information comprising subjective indicia of quality associated with the data set. The DQA circuitry may be further configured to generate, based on the first electronic information and the second electronic information, third electronic information comprising analytical indicia of quality associated with the data set. The DQA circuitry may be further configured to transmit the first electronic information, the second electronic information, and the third electronic information. The computing system may further comprise data quality certification (DQC) circuitry in communication with the DQA circuitry and configured to receive, from the DQA circuitry, the first electronic information, the second electronic information, and the third electronic information. The DQC circuitry may be further configured to generate a data quality rating for the data set based on the first electronic information, the second electronic information, and the third electronic information. The DQC circuitry may be further configured to generate a data quality categorization for the data set based on the data quality rating.

In another example embodiment, a computing apparatus is provided for categorizing a data set. The computing apparatus may comprise DQA circuitry configured to receive first electronic information comprising objective indicia of quality associated with the data set. The DQA circuitry may be further configured to receive second electronic information comprising subjective indicia of quality associated with the data set. The DQA circuitry may be further configured to generate, based on the first electronic information and the second electronic information, third electronic information comprising analytical indicia of quality associated with the data set. The DQA circuitry may be further configured to transmit the first electronic information, the second electronic information, and the third electronic information. The computing apparatus may further comprise DQC circuitry in communication with the DQA circuitry and configured to receive, from the DQA circuitry, the first electronic information, the second electronic information, and the third electronic information. The DQC circuitry may be further configured to generate a data quality rating for the data set based on the first electronic information, the second electronic information, and the third electronic information. The DQC circuitry may be further configured to generate a data quality categorization for the data set based on the data quality rating.

In yet another example embodiment, a method is provided for categorizing a data set. The method may comprise receiving, by DQA circuitry, first electronic information comprising objective indicia of quality associated with the data set. The method may further comprise receiving, by the DQA circuitry, second electronic information comprising subjective indicia of quality associated with the data set. The method may further comprise generating, by the DQA circuitry, third electronic information comprising analytical indicia of quality associated with the data set based on the first electronic information and the second electronic information. The method may further comprise transmitting, by the DQA circuitry to DQC circuitry in communication with the DQA circuitry, the first electronic information, the second electronic information, and the third electronic information. The method may further comprise receiving, by the DQC circuitry from the DQA circuitry, the first electronic information, the second electronic information, and the third electronic information. The method may further comprise generating, by the DQC circuitry, a data quality rating for the data set based on the first electronic information, the second electronic information, and the third electronic information. The method may further comprise generating, by the DQC circuitry, a data quality categorization for the data set based on the data quality rating.

In yet another example embodiment, a computer program product is provided for categorizing a data set. The computer program product may comprise at least one non-transitory computer-readable storage medium having computer-executable program code stored therein. The computer-executable program code may comprise program code instructions that, when executed, may cause a computing system to receive first electronic information comprising objective indicia of quality associated with the data set. The program code instructions, when executed, may further cause the computing system to receive second electronic information comprising subjective indicia of quality associated with the data set. The program code instructions, when executed, may further cause the computing system to generate, based on the first electronic information and the second electronic information, third electronic information comprising analytical indicia of quality associated with the data set. The program code instructions, when executed, may further cause the computing system to generate a data quality rating for the data set based on the first electronic information, the second electronic information, and the third electronic information. The program code instructions, when executed, may further cause the computing system to generate a data quality categorization for the data set based on the data quality rating.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

DETAILED DESCRIPTION

Figure 1:
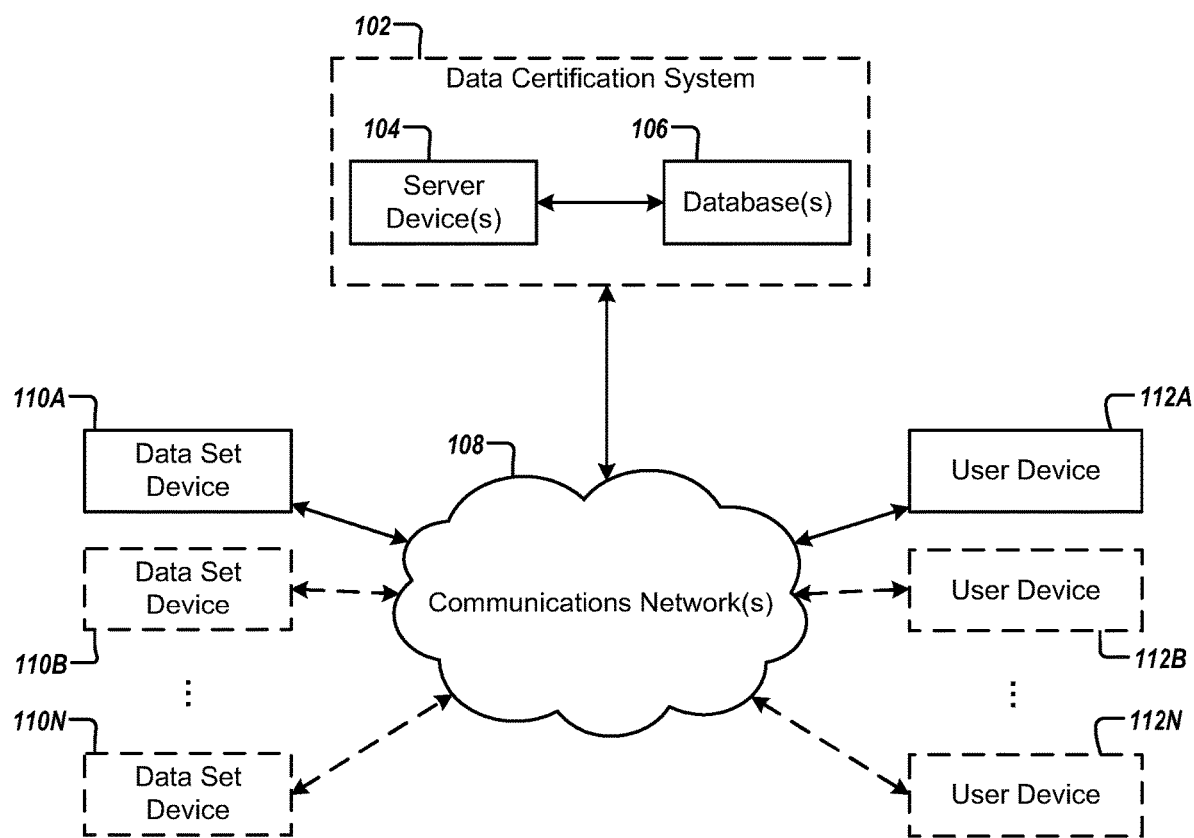
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for categorizing a data set. Traditionally, there has been no reliable indicia of the quality of a data set. Users requiring data thus are forced to either determine the quality of data sets through trial and error or through ad hoc correspondence with other users, which can be biased by any number of things, such as small or skewed sample sizes of other users who are consulted. Accordingly, the inventors have identified a latent need for a system facilitating more rigorous documentation of the quality of a data set.

In some embodiments, the present disclosure relates to a data certification system for evaluating data quality and applying a data quality certification to data sets. In general, the data certification system may evaluate the quality of data sets using objective metrics (i.e., origin, attestation, freshness, and coherence), subjective metrics (received, for example, as reviews provided by users), and in some embodiments, quality-related analytics sourced from either the objective metrics, the subjective metrics, or outcome data (e.g., using a feedback loop mechanism). From the quality evaluation, the data certification system may apply a data quality categorization to the data set that acts as a shorthand marker of data quality (e.g., AAA, AA, A, BBB, BB, B, etc.; platinum, gold, silver, bronze, etc.). In some embodiments, the data certification system may further provide a user interface for users to investigate the data quality ratings and reviews.

In some embodiments, the present disclosure relates to a software suite that can be deployed using hardware to evaluate and certify the quality of a data set. The software suite may comprise a data quality analysis (DQA) module and a data quality certification (DQC) module. The DQA module may obtain first electronic information comprising objective indicia of quality associated with the data set and second electronic information comprising subjective indicia of quality associated with the data set. In some instances, the DQA module may use, for example, origin or attestation as elements of objective data. The DQA module then may generate, based on the first electronic information and the second electronic information, third electronic information comprising analytical indicia of quality associated with the data set. The DQA module may transmit the first electronic information, the second electronic information, and the third electronic information to the DQC module, which may be in communication with the DQA module. The DQC module may obtain the first electronic information, the second electronic information, and the third electronic information from the DQA module. The DQC module then may generate a data quality rating for the data set based on the first electronic information, the second electronic information, and the third electronic information. Subsequently, the DQC module may generate a data quality categorization for the data set based on the data quality rating.

In some embodiments, the DQC module may generate a data quality certification for the data set based on the data quality categorization. In some embodiments, the software suite may also have a data certification storage (DCS) module to store the generated data quality certification as data set metadata in association with data set identification data indicative of an identity of the data set. For example, the DCS module may link the data set metadata and the data set identification data together using, for example, a linked list, struct, or other data structure that demonstrates the existence of an expressly inserted connection between the data set metadata and the data set identification data.

In some embodiments, the software suite may also have a user interface (UI) module to receive the data quality rating, the data quality categorization, and the data quality certification and generate data set identification content indicative of an identity of the data set. The UI module may then generate data quality certification content indicative of one or more of the data quality rating, the data quality categorization, and the data quality certification. Subsequently, the UI module may generate user interface data configured to be displayed by a display device, wherein the user interface data comprises the data set identification content and the data quality certification content.

In some embodiments, one or more of these modules may be hosted locally by a data set device or a user device. For example, the DQA module, the DQC module, the DCS module, the UI module, any other module, or any combination thereof may be hosted locally by a data set device or a user device that has been provided with specialized computerized components. In some embodiments, one or more of these modules may be hosted remotely (e.g., by one or more separate devices or one or more cloud servers) and thus need not reside on the data set device or user device.

In some embodiments, the data certification system described herein provides consistent and objective quality ratings to data sets by incorporating subjective reviews as a measure of data set quality, using a feedback loop to iteratively improve the objective measure of data quality, and categorizing data sets into quality categories. For example, the data certification system may use a feedback loop to update the scoring of a data element, wherein the scoring of data is based on second-order evaluation of the sources of the first-order objective and subject data, or alternatively based on outcomes stemming from subsequent use of the data.

There are many advantages of these and other embodiments described herein, such as generating rigorous, field-tested data quality ratings for data sets and revising those data quality ratings based on the outcomes of those data sets.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device or circuitry is described herein to receive data from a second computing device or circuitry, it will be appreciated that the data may be received directly from the second computing device or circuitry or may be received indirectly via one or more intermediary computing devices or circuitries, such as, for example, one or more servers, relays, routers, network access points, base stations, hosts, and/or the like, sometimes referred to herein as a "network." Similarly, where a first computing device or circuitry is described herein as sending data to a second computing device or circuitry, it will be appreciated that the data may be sent directly to the second computing device or circuitry or may be sent indirectly via one or more intermediary computing devices or circuitries, such as, for example, one or more servers, remote servers, cloud-based servers (e.g., cloud utilities), relays, routers, network access points, base stations, hosts, and/or the like.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "transmitter" refers to any component that can generate radio waves for communication purposes while a "receiver" is used to generally refer to any component that can receive radio waves and convert the information into useable form. A "transceiver" generally refers to a component that can both generate radio waves and receive radio waves and is thus contemplated when either a transmitter or a receiver is discussed.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "circuitry," "module," "software module," "utility," "cloud utility," "suite," and "software suite" (or other such terms) should be understood broadly to include hardware. In some embodiments, these terms may also include software for configuring the hardware. For example, in some embodiments, "circuitry" may include processing circuitry, memory, communications circuitry, and/or input-output circuitry. In some embodiments, other elements of the present disclosure may provide or supplement the functionality of particular circuitry, modules, utilities, or suites.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by a networked device, such as one or more servers, remote servers, cloud-based servers (e.g., cloud utilities), or other network entities, configured to communicate with one or more devices, such as one or more data set devices, user devices, or a combination thereof. Example embodiments of the user devices include any of a variety of stationary or mobile computing devices, such as a portable digital assistant (PDA), mobile telephone, smartphone, laptop computer, tablet computer, a desktop computer, an electronic workstation, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to generate, store, and retrieve certifications regarding the quality of data sets. As illustrated, a data certification system 102 may be connected to one or more server devices 104 in communication with one or more databases 106. The data certification system 102 may be connected to one or more data set devices 110A-110N (which may provide data sets, and possibly accompanying data regarding the data sets, to the data certification system 102 for certification) and one or more user devices 112A-112N (by which information about data sets can be retrieved or provided by users or other entities that utilize the data sets) through one or more communications networks 108. In some embodiments, the data certification system 102 may be configured to categorize or certify a data set provided by data set device 110 as described in further detail below.

The data certification system 102 may be embodied as one or more computers or computing systems as known in the art. In some embodiments, the data certification system 102 may provide for receiving first electronic information comprising objective indicia of quality associated with a data set from various sources, including but not necessarily limited to the data set devices 110A-110N, the user devices 112A-112N, or both. In some embodiments, the objective indicia of quality associated with the data set may comprise origin data indicative of a source of the data set, attestation data indicative of an attestation associated with the data set, freshness data indicative of the freshness of the data set, coherence data indicative of the coherence of the data set, any other suitable data or electronic information, or any combination thereof. The objective indicia of quality may be received from the data set device 110 from which the data set is retrieved by the data certification system 102, although in some embodiments, certain aspects of this objective indicia of quality (e.g., coherence data) may be received from a user device 112 that has evaluated the data set, or may even be generated by the data certification system 102 itself.

In some embodiments, the data certification system 102 may provide for receiving second electronic information comprising subjective indicia of quality associated with the data set from various sources, including but not necessarily limited to the data set devices 110A-110N, the user devices 112A-112N, or both. In some embodiments, the subjective indicia of quality associated with the data set may comprise subjective evaluation data comprising one or more subjective evaluations of the data set provided by one or more users.

In some embodiments, the data certification system 102 may provide for generating third electronic information comprising analytical indicia of quality associated with the data set based on the first electronic information and the second electronic information. In some embodiments, the data certification system 102 may provide for generating the third electronic information comprising the analytical indicia of quality associated with the data set further based on fourth electronic information comprising outcome indicia of quality associated with the data set.

In some instances, the data certification system 102 may provide for generating third electronic information comprising analytical indicia of quality based on objective indicia of quality associated with the data set by generating an origin reliability rating for the data set based on origin data indicative of a source of the data set and generating the third electronic information based on the origin reliability rating.

In some instances, the data certification system 102 may provide for generating third electronic information comprising analytical indicia of quality based on subjective indicia of quality associated with the data set by generating one or more subjective evaluation reliability ratings for the one or more subjective evaluations based on the subjective evaluation data and generating the third electronic information based on the one or more subjective evaluation reliability ratings.

In some instances, the data certification system 102 may provide for generating third electronic information comprising analytical indicia of quality based on one or more changes in the data set by generating variance data indicative of one or more changes in the data set between a first time and a second time different from the first time, generating a variance rating based on the variance data, and generating the third electronic information based on the variance rating.

In some instances, the data certification system 102 may provide for generating third electronic information comprising analytical indicia of quality based on outcome indicia of quality associated with the data set by receiving fourth electronic information comprising outcome indicia of quality associated with the data set and generating the third electronic information based on the fourth electronic information. For example, the outcome indicia of quality associated with the data set may comprise objective outcome evaluation data, subjective outcome evaluation data, any other outcome indicia of quality, or any combination thereof. The objective outcome evaluation data may comprise, for example, one or more objective evaluations of the outcome of the use of the data set. The subjective outcome evaluation data may comprise, for example, one or more subjective evaluations of the outcome of the use of the data set provided by one or more users.

The data certification system 102 may provide for generating the third electronic information comprising the analytical indicia of quality associated with the data set based on any electronic information, data, indicia, reviews, evaluations, categorizations, certifications, content, users, uses, applications, deployments, outcomes, embodiments, examples, figures, techniques, processes, operations, techniques, methods, systems, apparatuses, or computer program products described herein, or any combination thereof. In one illustrative example, the data certification system 102 may provide for generating the third electronic information by generating an origin reliability rating for the data set based on origin data indicative of a source of the data set, generating one or more subjective evaluation reliability ratings for the one or more subjective evaluations based on the subjective evaluation data, and generating the third electronic information based on the origin reliability rating and the one or more subjective evaluation reliability ratings. In another illustrative example, the data certification system 102 may provide for generating the third electronic information by generating an origin reliability rating for the data set based on origin data indicative of a source of the data set, generating one or more subjective evaluation reliability ratings for the one or more subjective evaluations based on the subjective evaluation data, generating variance data indicative of one or more changes in the data set between a first time and a second time different from the first time, generating a variance rating based on the variance data, and generating the third electronic information based on the origin reliability rating, the one or more subjective evaluation reliability ratings, and the variance rating. In yet another illustrative example, the data certification system 102 may provide for generating the third electronic information by generating an origin reliability rating for the data set based on origin data indicative of a source of the data set, generating one or more subjective evaluation reliability ratings for the one or more subjective evaluations based on the subjective evaluation data, generating variance data indicative of one or more changes in the data set between a first time and a second time different from the first time, generating a variance rating based on the variance data, receiving fourth electronic information comprising outcome indicia of quality associated with the data set, and generating the third electronic information based on the origin reliability rating, the one or more subjective evaluation reliability ratings, the variance rating, and the fourth electronic information.

In some embodiments, the data certification system 102 may provide for generating a data quality rating for the data set based on the first electronic information, the second electronic information, and the third electronic information. The data certification system 102 may provide for generating the data quality rating for the data set based on any electronic information, data, indicia, reviews, evaluations, categorizations, certifications, content, users, uses, applications, deployments, outcomes, embodiments, examples, figures, techniques, processes, operations, techniques, methods, systems, apparatuses, or computer program products described herein, or any combination thereof.

In some embodiments, the data certification system 102 may provide for generating a data quality categorization for the data set based on the data quality rating. The data certification system 102 may provide for generating the data quality categorization for the data set based on any electronic information, data, indicia, reviews, evaluations, categorizations, certifications, content, users, uses, applications, deployments, outcomes, embodiments, examples, figures, techniques, processes, operations, techniques, methods, systems, apparatuses, or computer program products described herein, or any combination thereof.

In some embodiments, the data certification system 102 may provide for generating a data quality certification for the data set based on the data quality categorization. In some instances, the data certification system 102 may provide for generating multiple data quality certifications for the data set based on different uses, deployments, or applications of the data set. For example, the data certification system 102 may provide for generating a first data quality certification for the data set based on a first use of the data set and generating a second data quality certification for the data set based on a second use of the data set, wherein the first use and the second use are different. The data certification system 102 may provide for generating the one or more data quality certifications for the data set based on any electronic information, data, indicia, reviews, evaluations, categorizations, certifications, content, users, uses, applications, deployments, outcomes, embodiments, examples, figures, techniques, processes, operations, techniques, methods, systems, apparatuses, or computer program products described herein, or any combination thereof.

In some embodiments, the data certification system 102 may provide for storing the data quality certification as data set metadata in association with data set identification data indicative of an identity of the data set. For example, the data certification system 102 may provide for storing the data quality certification as data set metadata in association with data set identification data by linking the data set metadata and the data set identification data together using, for example, a linked list, struct, or other data structure that demonstrates the existence of an expressly inserted connection between the data set metadata and the data set identification data.

In some embodiments, the data certification system 102 may provide for generating user interface data configured to be displayed by a display device. For example, the generated user interface data may comprise one or more of, or one or more portions of, data set identification content, data quality certification content, and data quality analysis content. In some embodiments, the data certification system 102 may provide for generating data set identification content indicative of an identity of the data set. In some embodiments, the data certification system 102 may provide for generating data quality certification content indicative of one or more of the data quality rating, the data quality categorization, and the data quality certification. In some instances, the generated user interface data may comprise, for example, the generated data set identification content and the generated data quality certification content. In some embodiments, the data certification system 102 may provide for generating data quality analysis content indicative of one or more first portions of the first electronic information, one or more second portions of the second electronic information, one or more third portions of the third electronic information, or a combination thereof. In some instances, the generated user interface data may comprise the generated data quality analysis content. The data certification system 102 may provide for generating the user interface data based on any electronic information, data, indicia, reviews, evaluations, categorizations, certifications, content, users, uses, applications, deployments, outcomes, embodiments, examples, figures, techniques, processes, operations, techniques, methods, systems, apparatuses, or computer program products described herein, or any combination thereof.

The one or more server devices 104 may be embodied as one or more servers, remote servers, cloud-based servers (e.g., cloud utilities), processors, or any other suitable server devices, or any combination thereof. The one or more server devices 104 receive, process, generate, and transmit data, signals, and electronic information to facilitate the operations of the data certification system 102.

The one or more databases 106 may be embodied as one or more data storage devices, such as a Network Attached Storage (NAS) device or devices, or as one or more separate databases or servers. The one or more databases 106 include information accessed and stored by the data certification system 102 to facilitate the operations of the data certification system 102. For example, the one or more databases 106 may store user account credentials for users of one or more data set devices 110A-110N, one or more user devices 112A-112N, or both. In another example, the one or more databases 106 may store data regarding device characteristics of various data set devices 110A-110N, user devices 112A-112N, or both.

The one or more data set devices 110A-110N may be embodied by any computing device known in the art. In some embodiments, the one or more data set devices 110A-110N may be embodied as one or more data storage devices, such as one or more NAS devices, or as one or more separate databases or database servers. In some embodiments, the one or more data set devices 110A-110N may be embodied as one or more servers, remote servers, cloud-based servers (e.g., cloud utilities), processors, or any other suitable devices, or any combination thereof. In some embodiments, the one or more data set devices 110A-110N may receive, process, generate, and transmit data, signals, and electronic information to facilitate the operations of the data certification system 102. Information received by the data certification system 102 from one or more data set devices 110A-110N may be provided in various forms and via various methods. It will be understood, however, that in some embodiments, the one or more data set devices 110A-110N need not themselves be databases or database servers, but may be peripheral devices communicatively coupled to databases or database servers.

In some embodiments, the one or more data set devices 110A-110N may include or store various data and electronic information associated with one or more data sets. For example, the one or more data set devices 110A-110N may include or store one or more data sets or one or more links or pointers thereto. In another example, the one or more data set devices 110A-110N may include or store first electronic information comprising objective indicia of quality (e.g., origin data indicative of a source of the data set, attestation data indicative of an attestation associated with the data set, freshness data indicative of the freshness of the data set, coherence data indicative of the coherence of the data set, any other suitable data or electronic information, or any combination thereof) associated with one or more data sets. In another example, the one or more data set devices 110A-110N may include or store second electronic information comprising subjective indicia of quality (e.g., subjective evaluation data comprising one or more subjective evaluations of the data set provided by one or more users) associated with one or more data sets. In another example, the one or more data set devices 110A-110N may include or store third electronic information comprising analytical indicia of quality associated with one or more data sets based on the first electronic information and the second electronic information. In another example, the one or more data set devices 110A-110N may include or store fourth electronic information comprising outcome indicia of quality associated with one or more data sets. In yet another example, the one or more data set devices 110A-110N may include or store one or more origin reliability ratings, subjective evaluation reliability ratings, variance data, variance ratings, data quality ratings, data quality categorizations, data quality certifications, data set metadata, data set identification data, associations, pointers, links, linked lists, structs, data structures, data set uses, data set deployments, data set applications, data set identification content, data quality certification content, user interface data, data quality analysis content, any other suitable data or electronic information; or any combination of the foregoing data or electronic information.

The one or more user devices 112A-112N may be embodied by any computing device known in the art. Information received by the data certification system 102 from the one or more user devices 112A-112N may be provided in various forms and via various methods. For example, the one or more user devices 112A-112N may be laptop computers, smartphones, netbooks, tablet computers, wearable devices, desktop computers, electronic workstations, or the like, and the information may be provided through various modes of data transmission provided by these user devices.

In embodiments where a user device 112 is a mobile device, such as a smartphone or tablet, the mobile device may execute an "app" (e.g., a thin-client application) to interact with the data certification system 102 and/or one or more data set devices 110A-110N. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., data set devices, user devices). Communication with hardware and software modules executing outside of the app is typically provided via application programming interfaces (APIs) provided by the mobile device operating system.

Additionally or alternatively, the one or more data set devices 110A-110N, the one or more user devices 112A-112N, or any combination thereof may interact with the data certification system 102 over one or more communications networks 108. As yet another example, the one or more data set devices 110A-110N and/or the one or more user devices 112A-112N may include various hardware or firmware designed to interface with the data certification system 102. For example, an example data set device 110A may be a database server modified to communicate with the data certification system 102, and another example data set device 110B may be a purpose-built device offered for the primary purpose of communicating with the data certification system 102. As another example, an example user device 112A may be a user's workstation and may have an application stored thereon facilitating communication with the data certification system 102, whereas another example user device 112B may be a purpose-built device (e.g., a kiosk) offered for the primary purpose of communicating with the data certification system 102.

Example Implementing Apparatus

Figure 2:
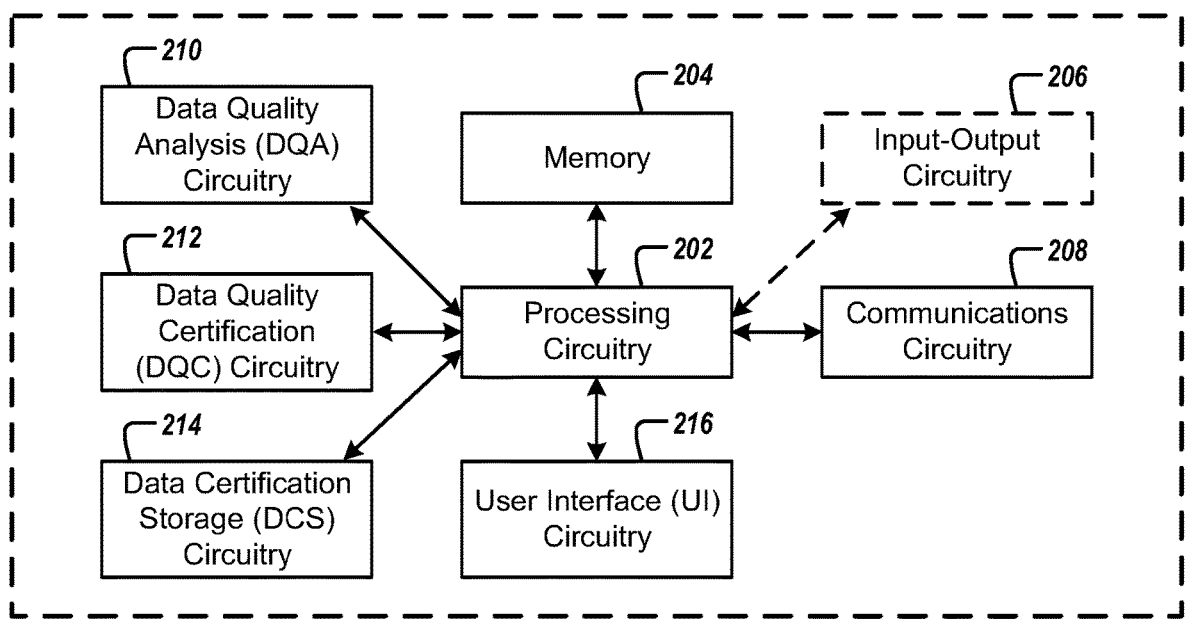
FIG. 2 illustrates a schematic block diagram of example circuitry that may perform various operations in accordance with some example embodiments described herein.

The data certification system 102 described with reference to FIG. 1 may be embodied by one or more computing systems, such as apparatus 200 shown in FIG. 2. As illustrated in FIG. 2, the apparatus 200 may include processing circuitry 202, memory 204, input-output circuitry 206, communications circuitry 208, data quality analysis (DQA) circuitry 210, data quality certification (DQC) circuitry 212, data certification storage (DCS) circuitry 214, and user interface (UI) circuitry 216. The apparatus 200 may be configured to execute the operations described above with respect to FIG. 1 and below with respect to FIGS. 3-9. Although some of these components 202-216 are described with respect to their functional capabilities, it should be understood that the particular implementations necessarily include the use of particular hardware to implement such functional capabilities. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure. For example, the memory 204 may be configured to store data and electronic information associated with one or more data sets and updates or revisions thereof. In some instances, the memory 204 may be configured to store one or more data sets or one or more links or pointers thereto. In some instances, the memory 204 may be configured to store data set identification data for one or more data sets. It will be understood that the memory 204 may be configured to store any electronic information, data, indicia, reviews, evaluations, categorizations, certifications, content, users, uses, applications, deployments, outcomes, embodiments, examples, figures, techniques, processes, operations, techniques, methods, systems, apparatuses, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the algorithms and/or operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a command provided by a user. The input-output circuitry 206 may comprise a user interface and may include a display that may include a web user interface, a mobile application, a client device, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may generate user interface data for display by one or more other devices with which one or more users directly interact and transmit the generated user interface data to one or more of those devices.

The communications circuitry 208 may be any device or circuitry embodied in either hardware or a combination of hardware and software that is configured to receive and/or transmit data from or to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, Near Field Communications (NFC), Worldwide Interoperability for Microwave Access (WiMAX) or other proximity-based communications protocols.

The DQA circuitry 210 includes hardware components designed or configured to receive first electronic information comprising objective indicia of quality associated with a data set. These hardware components may, for instance, utilize communications circuitry 208 or any suitable wired or wireless communications path to communicate with a data set device (e.g., one or more of data set devices 110A-110N), a user device (e.g., one or more of user devices 112A-112N), DQC circuitry 212, DCS circuitry 214, UI circuitry 216, or any other suitable circuitry or device. For example, the DQA circuitry 210 may be in communication with one or more data set devices (e.g., one or more data set devices 110A-110N), and thus configured to receive the first electronic information comprising the objective indicia of quality associated with the data set from the one or more data set devices. In some embodiments, the DQA circuitry 210 may be configured to receive the first electronic information comprising the objective indicia of quality associated with the data set from memory 204. In some embodiments, the objective indicia of quality associated with the data set may comprise origin data indicative of a source of the data set, attestation data indicative of an attestation associated with the data set, freshness data indicative of the freshness of the data set, coherence data indicative of the coherence of the data set, any other suitable data or electronic information, or any combination thereof. It should also be appreciated that, in some embodiments, the DQA circuitry 210 may include a separate processor, specially configured field programmable gate array (FPGA), application specific interface circuit (ASIC), or cloud utility to perform the above functions.

In some embodiments, the DQA circuitry 210 may include hardware components designed or configured to receive second electronic information comprising subjective indicia of quality associated with the data set. These hardware components may, for instance, utilize communications circuitry 208 or any suitable wired or wireless communications path to communicate with a data set device (e.g., one or more of data set devices 110A-110N), a user device (e.g., one or more of user devices 112A-112N), DQC circuitry 212, DCS circuitry 214, UI circuitry 216, or any other suitable circuitry or device. For example, the DQA circuitry 210 may be in communication with one or more data set devices (e.g., one or more data set devices 110A-110N), and thus configured to receive the second electronic information comprising the subjective indicia of quality associated with the data set from the one or more data set devices. In another example, the DQA circuitry 210 may be in communication with one or more user devices (e.g., one or more user devices 112A-112N), and thus configured to receive the second electronic information comprising the subjective indicia of quality associated with the data set from the one or more user devices. In some embodiments, the DQA circuitry 210 may be configured to receive the second electronic information comprising the subjective indicia of quality associated with the data set from memory 204. In some embodiments, the subjective indicia of quality associated with the data set may comprise subjective evaluation data comprising one or more subjective evaluations of the data set provided by one or more users.

In some embodiments, the DQA circuitry 210 may include hardware components designed or configured to generate third electronic information comprising analytical indicia of quality associated with the data set based on the first electronic information and the second electronic information. For example, DQA circuitry 210 may include hardware components designed or configured to receive first electronic information comprising origin data indicative of a source of the data set, receive second electronic information comprising subjective evaluation data comprising one or more subjective evaluations of the data set provided by one or more users, generate an origin reliability rating for the data set based on the received origin data, generate one or more subjective evaluation reliability ratings for the one or more subjective evaluations based on the received subjective evaluation data, and generate the third electronic information based on the generated origin reliability rating and the generated one or more subjective evaluation reliability ratings. In another example, the DQA circuitry 210 may include hardware components designed or configured to generate, based on the received first electronic information, variance data indicative of one or more changes in the data set between a first time and a second time different from the first time, generate a variance rating based on the generated variance data, and generate the third electronic information further based on the generated variance rating.

In some embodiments, the DQA circuitry 210 may include hardware components designed or configured to receive fourth electronic information comprising outcome indicia of quality associated with the data set. These hardware components may, for instance, utilize communications circuitry 208 or any suitable wired or wireless communications path to communicate with a data set device (e.g., one or more of data set devices 110A-110N), a user device (e.g., one or more of user devices 112A-112N), DQC circuitry 212, DCS circuitry 214, UI circuitry 216, or any other suitable circuitry or device. For example, the DQA circuitry 210 may be in communication with one or more data set devices (e.g., one or more data set devices 110A-110N), and thus configured to receive the fourth electronic information comprising the outcome indicia of quality associated with the data set from the one or more data set devices. In another example, the DQA circuitry 210 may be in communication with one or more user devices (e.g., one or more user devices 112A-112N), and thus configured to receive the fourth electronic information comprising outcome indicia of quality associated with the data set from the one or more user devices. In some embodiments, the DQA circuitry 210 may be configured to receive the fourth electronic information comprising outcome indicia of quality from memory 204. For example, the outcome indicia of quality associated with the data set may comprise objective outcome evaluation data, subjective outcome evaluation data, any other outcome indicia of quality, or any combination thereof. The objective outcome evaluation data may comprise, for example, one or more objective evaluations of the outcome of the use of the data set. The subjective outcome evaluation data may comprise, for example, one or more subjective evaluations of the outcome of the use of the data set provided by one or more users. In some embodiments, the DQA circuitry 210 may include hardware components designed or configured to generate the third electronic information further based on the fourth electronic information.

The DQA circuitry 210 may include hardware components designed or configured to generate the third electronic information comprising the analytical indicia of quality associated with the data set based on any electronic information, data, indicia, reviews, evaluations, categorizations, certifications, content, users, uses, applications, deployments, outcomes, embodiments, examples, figures, techniques, processes, operations, techniques, methods, systems, apparatuses, or computer program products described herein, or any combination thereof. For instance, the DQA circuitry 210 may include hardware components designed or configured to generate the third electronic information comprising the analytical indicia of quality associated with the data set based on any embodiment or combination of embodiments described with reference to FIGS. 1-9.

In some embodiments, the DQA circuitry 210 includes hardware components designed or configured to transmit the third electronic information, and the fourth electronic information. These hardware components may, for instance, utilize communications circuitry 208 or any suitable wired or wireless communications path to communicate with a data set device (e.g., one or more of data set devices 110A-110N), a user device (e.g., one or more of user devices 112A-112N), DQC circuitry 212, DCS circuitry 214, UI circuitry 216, or any other suitable circuitry or device. For example, the DQA circuitry 210 may be in communication with the DQC circuitry 212, and thus configured to transmit one or more of the first electronic information, the second electronic information, the third electronic information, and the fourth electronic information to the DQC circuitry 212. In another example, the DQA circuitry 210 may be in communication with the DCS circuitry 214, and thus configured to transmit one or more of the first electronic information, the second electronic information, the third electronic information, and the fourth electronic information to the DCS circuitry 214. In another example, the DQA circuitry 210 may be in communication with the UI circuitry 216, and thus configured to transmit one or more of the first electronic information, the second electronic information, the third electronic information, and the fourth electronic information to the UI circuitry 216. In another example, the DQA circuitry 210 may be in communication with one or more data set devices (e.g., one or more data set devices 110A-110N), and thus configured to transmit one or more of the first electronic information, the second electronic information, the third electronic information, and the fourth electronic information to the one or more data set devices. In another example, the DQA circuitry 210 may be configured to transmit one or more of the first electronic information, the second electronic information, the third electronic information, and the fourth electronic information to memory 204.

The DQC circuitry 212 includes hardware components designed or configured to receive the first electronic information, the second electronic information, and the third electronic information. These hardware components may, for instance, utilize communications circuitry 208 or any suitable wired or wireless communications path to communicate with a data set device (e.g., one or more of data set devices 110A-110N), a user device (e.g., one or more of user devices 112A-112N), DQA circuitry 210, DCS circuitry 214, UI circuitry 216, or any other suitable circuitry or device. For example, the DQC circuitry 212 may be in communication with the DQA circuitry 210, and thus configured to receive one or more of the first electronic information, the second electronic information, and the third electronic information from the DQA circuitry 210. In another example, the DQC circuitry 212 may be in communication with one or more data set devices (e.g., one or more data set devices 110A-110N), and thus configured to receive one or more of the first electronic information, the second electronic information, and the third electronic information from the one or more data set devices. In some embodiments, the DQC circuitry 212 may be configured to receive one or more of the first electronic information, the second electronic information, and the third electronic information from memory 204. It should also be appreciated that, in some embodiments, the DQC circuitry 212 may include a separate processor, specially configured field programmable gate array (FPGA), application specific interface circuit (ASIC), or cloud utility to perform the above functions.

In some embodiments, the DQC circuitry 212 may include hardware components designed or configured to generate a data quality rating for the data set based on the first electronic information, the second electronic information, and the third electronic information. The DQC circuitry 212 may include hardware components designed or configured to generate the data quality rating for the data set based on any electronic information, data, indicia, reviews, evaluations, categorizations, certifications, content, users, uses, applications, deployments, outcomes, embodiments, examples, figures, techniques, processes, operations, techniques, methods, systems, apparatuses, or computer program products described herein, or any combination thereof. For instance, the DQC circuitry 212 may include hardware components designed or configured to generate the data quality rating for the data set based on any embodiment or combination of embodiments described with reference to FIGS. 1-9.

In some embodiments, the DQC circuitry 212 may include hardware components designed or configured to generate a data quality categorization for the data set based on the data quality rating. The DQC circuitry 212 may include hardware components designed or configured to generate the data quality categorization for the data set based on any electronic information, data, indicia, reviews, evaluations, categorizations, certifications, content, users, uses, applications, deployments, outcomes, embodiments, examples, figures, techniques, processes, operations, techniques, methods, systems, apparatuses, or computer program products described herein, or any combination thereof. For instance, the DQC circuitry 212 may include hardware components designed or configured to generate the data quality categorization for the data set based on any embodiment or combination of embodiments described with reference to FIGS. 1-9.

In some embodiments, the DQC circuitry 212 may include hardware components designed or configured to generate a data quality certification for the data set based on the data quality categorization. In some instances, the DQC circuitry 212 may include hardware components designed or configured to generate multiple data quality certifications for the data set based on different uses, deployments, or applications of the data set. For example, the DQC circuitry 212 may include hardware components designed or configured to generate a first data quality certification for the data set based on a first use of the data set and generate a second data quality certification for the data set based on a second use of the data set, wherein the first use and the second use are different.

The DQC circuitry 212 may include hardware components designed or configured to generate the one or more data quality certifications for the data set based on any electronic information, data, indicia, reviews, evaluations, categorizations, certifications, content, users, uses, applications, deployments, outcomes, embodiments, examples, figures, techniques, processes, operations, techniques, methods, systems, apparatuses, or computer program products described herein, or any combination thereof. For instance, the DQC circuitry 212 may include hardware components designed or configured to generate the one or more data quality certifications for the data set based on any embodiment or combination of embodiments described with reference to FIGS. 1-9.

In some embodiments, the DQC circuitry 212 includes hardware components designed or configured to transmit the data quality rating, the data quality categorization, and the one or more data quality certifications. These hardware components may, for instance, utilize communications circuitry 208 or any suitable wired or wireless communications path to communicate with a data set device (e.g., one or more of data set devices 110A-110N), a user device (e.g., one or more of user devices 112A-112N), DQC circuitry 212, DCS circuitry 214, UI circuitry 216, or any other suitable circuitry or device. For example, the DQC circuitry 212 may be in communication with the DCS circuitry 214, and thus configured to transmit one or more of the data quality rating, the data quality categorization, and the one or more data quality certifications to the DCS circuitry 214. In another example, the DQC circuitry 212 may be in communication with one or more data set devices (e.g., one or more data set devices 110A-110N), and thus configured to transmit one or more of the data quality rating, the data quality categorization, and the one or more data quality certifications to the one or more data set devices. In another example, the DQC circuitry 212 may be configured to transmit one or more of the data quality rating, the data quality categorization, and the one or more data quality certifications to memory 204.

The DCS circuitry 214 includes hardware components designed or configured to store the one or more data quality certifications as data set metadata in association with data set identification data indicative of an identity of the data set. These hardware components may, for instance, utilize communications circuitry 208 or any suitable wired or wireless communications path to communicate with a data set device (e.g., one or more of data set devices 110A-110N), a user device (e.g., one or more of user devices 112A-112N), DQA circuitry 210, DQC circuitry 212, UI circuitry 216, or any other suitable circuitry or device. For example, the DCS circuitry 214 may be in communication with the DQC circuitry 212, and thus configured to receive the one or more data quality certifications from the DQC circuitry 212. In another example, the DCS circuitry 214 may be in communication with one or more data set devices (e.g., one or more data set devices 110A-110N), and thus configured to receive one or more of the data set identification data and the one or more data quality certifications from the one or more data set devices and transmit the data quality certification to the one or more data set devices for storage, in one or more memories of or coupled to the one or more data set devices, as data set metadata in association with data set identification data. In some embodiments, the DCS circuitry 214 may be configured to receive one or more of the data set identification data and the one or more data quality certifications from memory 204 and transmit the data quality certification to memory 204 for storage as data set metadata in association with data set identification data. For example, the DCS circuitry 214 may include hardware components designed or configured to store the data quality certification as data set metadata in association with data set identification data by linking the data set metadata and the data set identification data together using, for example, a linked list, struct, or other data structure that demonstrates the existence of an expressly inserted connection between the data set metadata and the data set identification data. It should also be appreciated that, in some embodiments, the DCS circuitry 214 may include a separate processor, specially configured field programmable gate array (FPGA), application specific interface circuit (ASIC), or cloud utility to perform the above functions.

The UI circuitry 216 includes hardware components designed or configured to generate user interface data configured to be displayed by a display device. For example, the generated user interface data may comprise one or more of, or one or more portions of, data set identification content, data quality certification content, and data quality analysis content. For example, the UI circuitry 216 may be configured to generate user interface data and transmit the generated user interface data to the input-output circuitry 206, and the input-output circuitry 206 may be configured to receive the user interface data and display the received user interface data on one or more display screens.

In some embodiments, the UI circuitry 216 may include hardware components designed or configured to generate the user interface data based on one or more portions of the data set identification data, the first electronic information, the second electronic information, the third electronic information, the fourth electronic information, the data quality rating, the data quality categorization, and the data quality certifications described herein. These hardware components may, for instance, utilize communications circuitry 208 or any suitable wired or wireless communications path to communicate with a data set device (e.g., one or more of data set devices 110A-110N), a user device (e.g., one or more of user devices 112A-112N), DQA circuitry 210, DQC circuitry 212, DCS circuitry 214, or any other suitable circuitry or device. For example, the UI circuitry 216 may be in communication with the DQA circuitry 210, and thus configured to receive one or more of the first electronic information, the second electronic information, the third electronic information, and the fourth electronic information from the one or more data set devices. In another example, the UI circuitry 216 may be in communication with the DQC circuitry 212, and thus configured to receive one or more of the data quality rating, the data quality categorization, and the data quality certifications from the one or more data set devices. In another example, the UI circuitry 216 may be in communication with one or more data set devices (e.g., one or more data set devices 110A-110N), and thus configured to receive one or more of the data set identification data, the first electronic information, the second electronic information, the third electronic information, the fourth electronic information, the data quality rating, the data quality categorization, and the data quality certifications from the one or more data set devices. In some embodiments, the UI circuitry 216 may be configured to receive one or more of the data set identification data, the first electronic information, the second electronic information, the third electronic information, the fourth electronic information, the data quality rating, the data quality categorization, and the data quality certifications from memory 204. It should also be appreciated that, in some embodiments, the UI circuitry 216 may include a separate processor, specially configured field programmable gate array (FPGA), application specific interface circuit (ASIC), or cloud utility to perform the above functions.

In some embodiments, the UI circuitry 216 may include hardware components designed or configured to generate data set identification content indicative of an identity of the data set. In some embodiments, the UI circuitry 216 may include hardware components designed or configured to generate data quality certification content indicative of one or more of the data quality rating, the data quality categorization, and the data quality certification. In some instances, the generated user interface data may comprise, for example, the generated data set identification content and the generated data quality certification content.

In some embodiments, the UI circuitry 216 includes hardware components designed or configured to generate data quality analysis content indicative of one or more first portions of the first electronic information, one or more second portions of the second electronic information, one or more third portions of the third electronic information, or a combination thereof. In some instances, the generated user interface data may comprise the generated data quality analysis content.

The UI circuitry 216 includes hardware components designed or configured to generate the user interface data based on any electronic information, data, indicia, reviews, evaluations, categorizations, certifications, content, users, uses, applications, deployments, outcomes, embodiments, examples, figures, techniques, processes, operations, techniques, methods, systems, apparatuses, or computer program products described herein, or any combination thereof. For instance, the UI circuitry 216 includes hardware components designed or configured to generate the user interface data based on any embodiment or combination of embodiments described with reference to FIGS. 1-9.

In some embodiments, one or more of the DQA circuitry 210, DQC circuitry 212, DCS circuitry 214, and UI circuitry 216 may be hosted locally by the apparatus 200. In some embodiments, one or more of the DQA circuitry 210, DQC circuitry 212, DCS circuitry 214, and UI circuitry 216 may be hosted remotely (e.g., by one or more cloud servers) and thus need not physically reside on the apparatus 200. Thus, some or all of the functionality described herein may be provided by a third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the DQA circuitry 210, DQC circuitry 212, DCS circuitry 214, and/or UI circuitry 216. In some embodiments, the DQA circuitry 210 may be deployed as a first cloud utility, the DQC circuitry 212 may be deployed as a second cloud utility, the DCS circuitry 214 may be deployed as a third cloud utility, and the UI circuitry 216 may be deployed as a fourth cloud utility.

As will be appreciated, any such computer program instructions and/or other type of code may be loaded onto a computer, processor or other programmable apparatus's circuitry to produce a machine, such that the computer, processor, or other programmable circuitry that executes the code on the machine creates the means for implementing various functions, including those described herein.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

The data set devices 110A-110N and user devices 112A-112N may be embodied by one or more computing devices or systems that also may include processing circuitry, memory, input-output circuitry, and communications circuitry. For example, a data set device 110 may be a database server on which computer code (e.g., C, C++, C#, java, a structured query language (SQL), a data query language (DQL), a data definition language (DDL), a data control language (DCL), a data manipulation language (DML)) is running or otherwise being executed by processing circuitry. In another example, a user device 112 may be a smartphone on which an app (e.g., a mobile database app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data (e.g., electronic marketing information, business analytic data, or the like) with the data certification system described herein.

Figure 3:
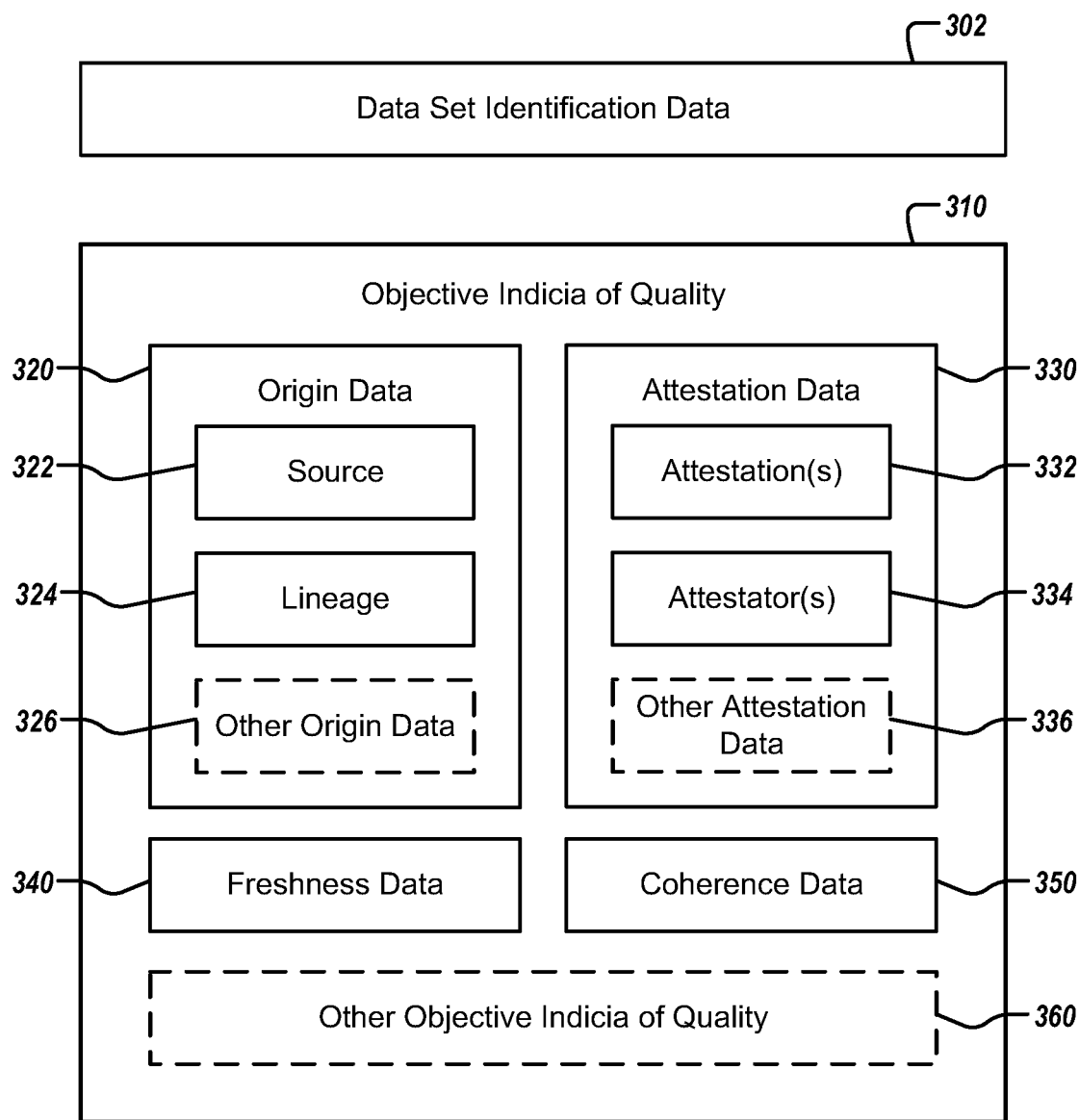
FIG. 3 illustrates example electronic information comprising objective indicia of quality associated with a data set in accordance with some example embodiments described herein.

FIG. 3 illustrates example electronic information 300 comprising objective indicia of quality 310 associated with a data set in accordance with some example embodiments described herein. In some embodiments, electronic information 300 may comprise data set identification data 302 indicative of an identity of the data set in accordance with some example embodiments described herein. As shown in FIG. 3, the objective indicia of quality 310 associated with the data set may comprise origin data 320 comprising or indicative of a source 322 of the data set, lineage 324 of the data set, other origin data 326 of the data set, or any combination thereof. As further shown in FIG. 3, the objective indicia of quality 310 associated with the data set may comprise attestation data 330 comprising or indicative of one or more attestations 332 associated with the data set and provided by one or more attestators 334 (e.g., data quality stewards), other attestation data 336, or any combination thereof. As further shown in FIG. 3, the objective indicia of quality 310 associated with the data set may comprise freshness data 340 indicative of the freshness of the data set. As further shown in FIG. 3, the objective indicia of quality 310 associated with the data set may comprise coherence data 350 indicative of the coherence of the data set. As further shown in FIG. 3, the objective indicia of quality 310 associated with the data set may comprise other objective indicia of quality 360 associated with the data set or any combination of the foregoing data or electronic information.

Figure 4:
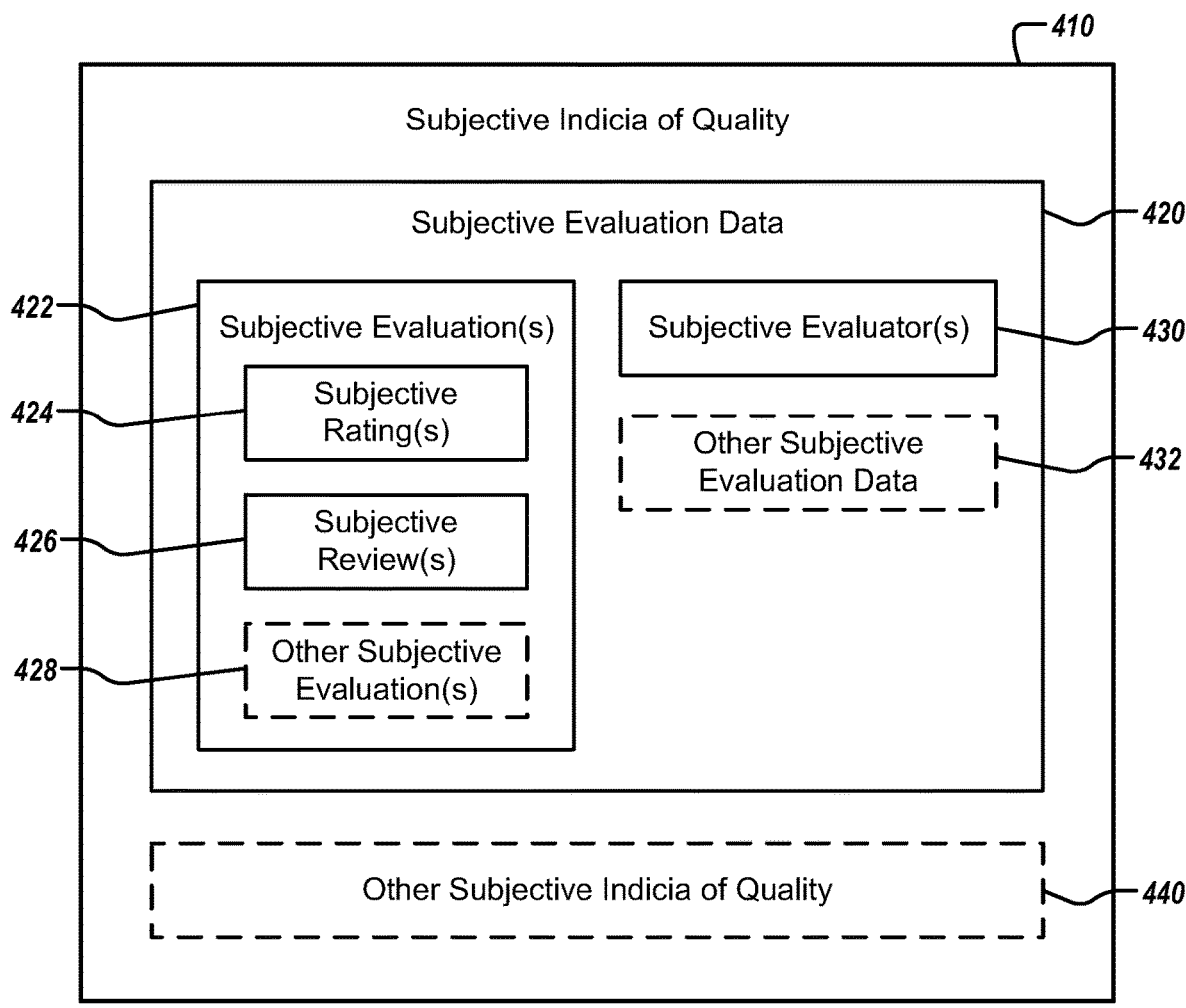
FIG. 4 illustrates example electronic information comprising subjective indicia of quality associated with a data set in accordance with some example embodiments described herein.

FIG. 4 illustrates example electronic information 400 comprising subjective indicia of quality 410 associated with a data set in accordance with some example embodiments described herein. As shown in FIG. 4, the subjective indicia of quality 410 associated with the data set may comprise subjective evaluation data 420, other subjective indicia of quality 440, or any combination thereof. The subjective evaluation data 420 may comprise one or more subjective evaluations 422 of the data set provided by one or more subjective evaluators 430 (e.g., users, reviewers), other subjective evaluation data 432, or any combination thereof. Each of the one or more subjective evaluations 422 of the data set may comprise, for example, one or more subjective ratings 424, subjective reviews 426, other subjective evaluations 428, or any combination thereof.

Figure 5:
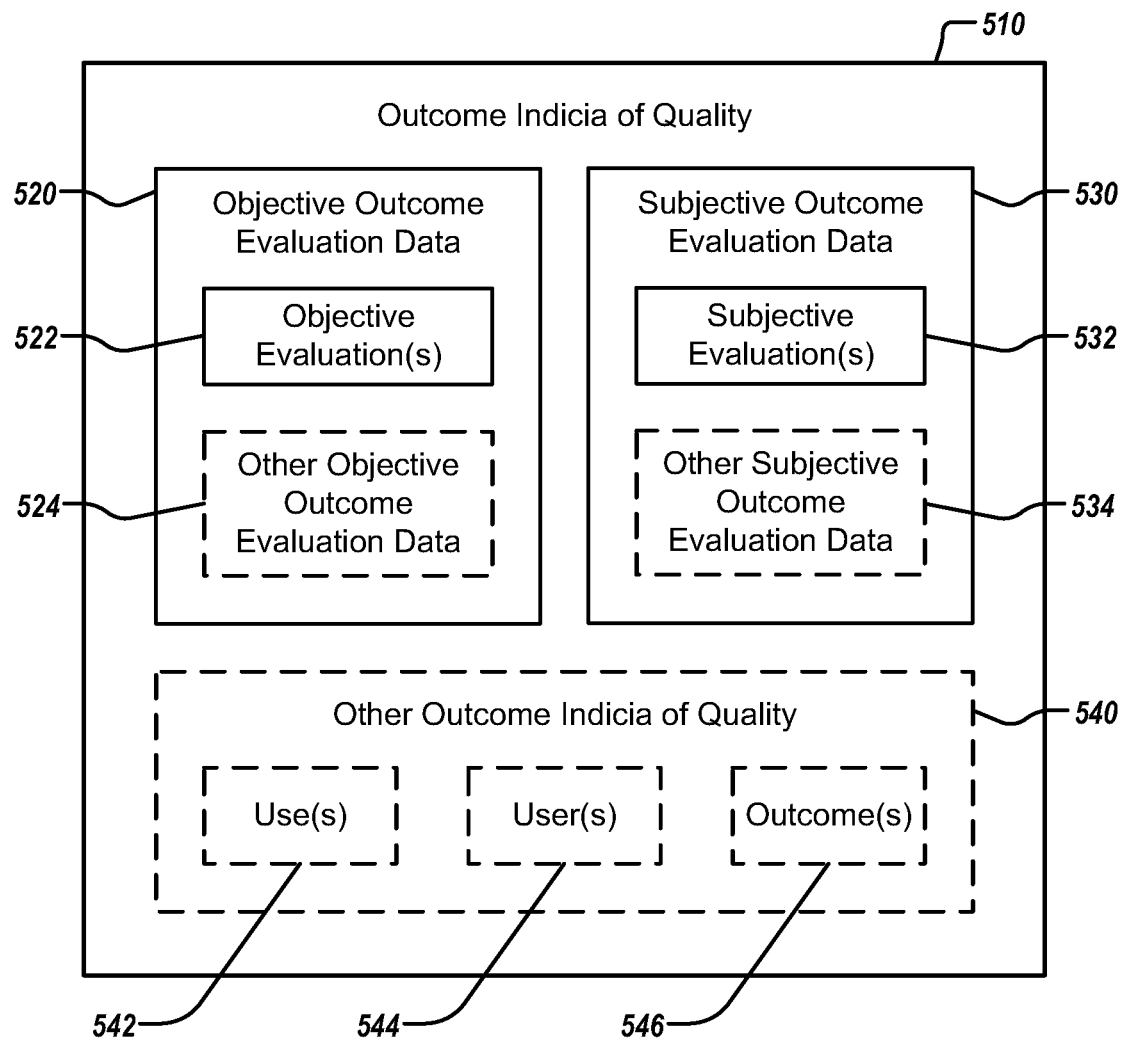
FIG. 5 illustrates example electronic information comprising outcome indicia of quality associated with a data set in accordance with some example embodiments described herein.

FIG. 5 illustrates example electronic information 500 comprising outcome indicia of quality 510 associated with a data set in accordance with some example embodiments described herein. As shown in FIG. 5, the outcome indicia of quality 510 associated with the data set may comprise objective outcome evaluation data 520, subjective outcome evaluation data 530, other outcome indicia of quality 540, or any combination thereof. The objective outcome evaluation data 520 may comprise, for example, one or more objective evaluations 522 of the outcome of the use of the data set, other objective outcome evaluation data 524, or any combination thereof. The subjective outcome evaluation data 530 may comprise, for example, one or more subjective evaluations 532 of the outcome of the use of the data set provided by one or more evaluators, reviews, or users, other subjective outcome evaluation data 534, or any combination thereof. The other outcome indicia of quality 540 may comprise, for example, electronic information indicative of one or more outcomes 546 of one or more uses 542 of the data set by one or more users 544.

Figure 6:
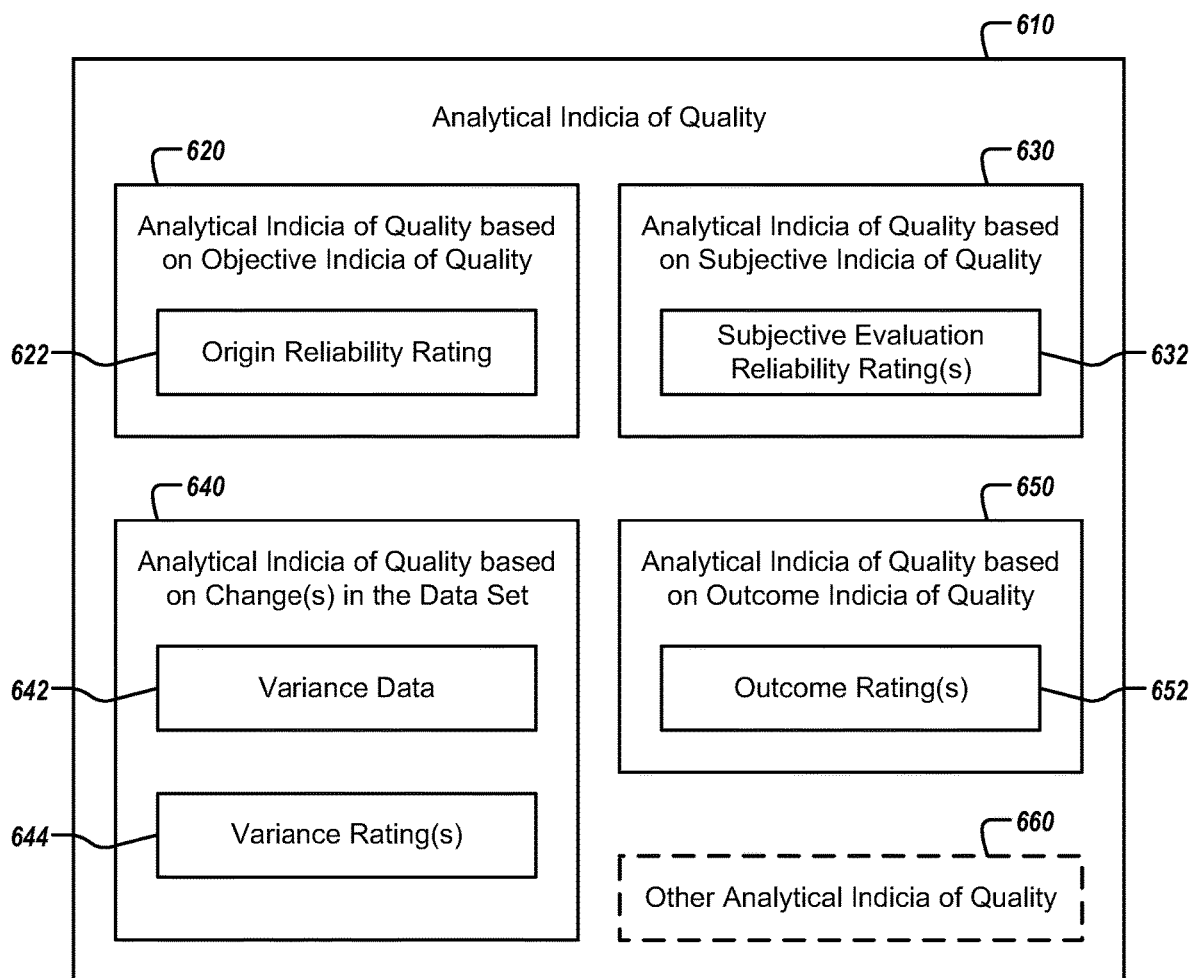
FIG. 6 illustrates example electronic information comprising analytical indicia of quality associated with a data set in accordance with some example embodiments described herein.

FIG. 6 illustrates example electronic information 600 comprising analytical indicia of quality 610 associated with a data set in accordance with some example embodiments described herein. The analytical indicia of quality 610 may be generated based on the objective indicia of quality 310 described with reference to FIG. 3, subjective indicia of quality 410 described with reference to FIG. 4, one or more changes in the data set, outcome indicia of quality 510 described with reference to FIG. 5, any other suitable electronic information or data, or any combination thereof.

As shown in FIG. 6, the analytical indicia of quality 610 associated with the data set may comprise analytical indicia of quality 620 based on objective indicia of quality associated with the data set, analytical indicia of quality 630 based on subjective indicia of quality associated with the data set, analytical indicia of quality 640 based on one or more changes in the data set, analytical indicia of quality 650 based on outcome indicia of quality associated with the data set, other analytical indicia of quality 660 based on any other data or electronic information, or any combination thereof. The analytical indicia of quality 620 based on objective indicia of quality associated with the data set may comprise, for example, an origin reliability rating 622 for the data set based on origin data (e.g., origin data 320 described with reference to FIG. 3) indicative of a source of the data set. The analytical indicia of quality 630 based on subjective indicia of quality associated with the data set may comprise, for example, one or more subjective evaluation reliability ratings 632 for the one or more subjective evaluations (e.g., one or more subjective evaluations 432 described with reference to FIG. 4) of the data set. The analytical indicia of quality 640 based on one or more changes in the data set may comprise variance data 642 indicative of one or more changes in the data set between a first time and a second time different from the first time and one or more variance ratings 644 generated based on the variance data 642. The analytical indicia of quality 650 based on outcome indicia of quality associated with the data set may comprise, for example, one or more outcome ratings 652 for the one or more outcomes of the one or more uses of the data set by the one or more users.

Figure 7:
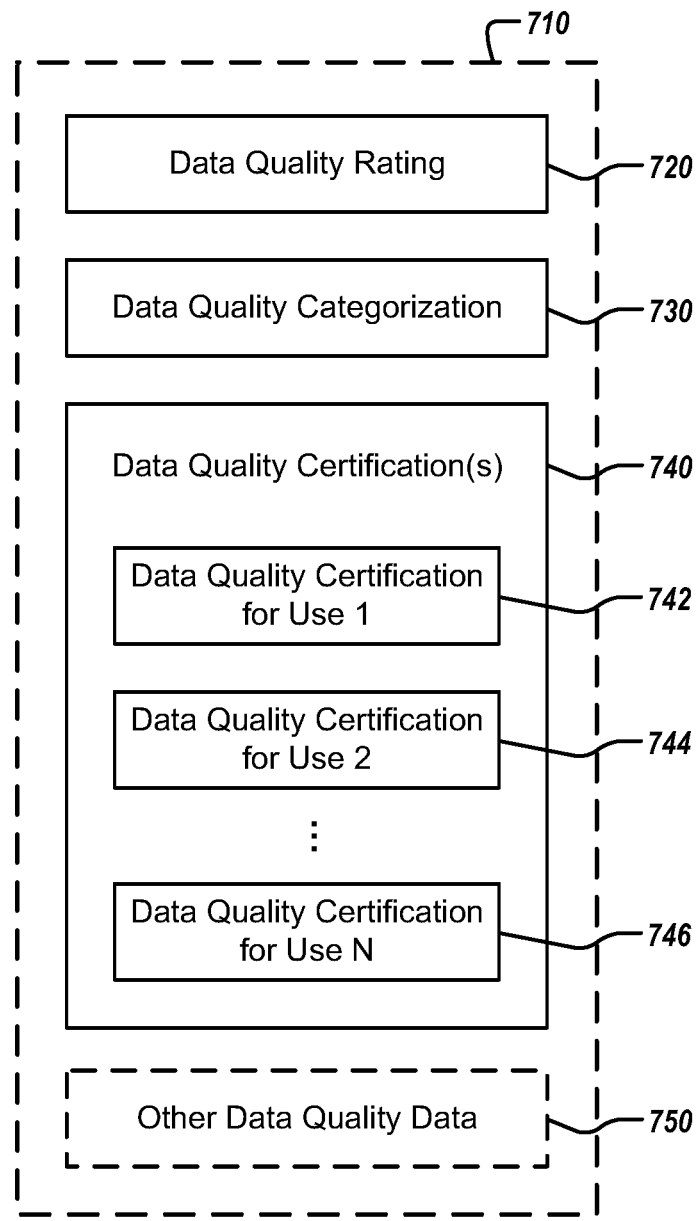
FIG. 7 illustrates example electronic information indicative of data quality associated with a data set in accordance with some example embodiments described herein.

FIG. 7 illustrates example electronic information 700 comprising electronic information 710 indicative of data quality associated with a data set in accordance with some example embodiments described herein. As shown in FIG. 7, electronic information 710 may comprise a data quality rating 720 for the data set generated based on the objective indicia of quality 310 described with reference to FIG. 3, the subjective indicia of quality 410 described with reference to FIG. 4, the outcome indicia of quality 510 described with reference to FIG. 5, the analytical indicia of quality 610 described with reference to FIG. 6, any other suitable electronic information or data, or any combination thereof. The data quality rating 720 may be, for example, a numerical score (e.g., "9.8"; "9.8/10"; "8,470"; "8.5"; "92"; "92/100"; etc.) indicative of the quality of the data set.

As further shown in FIG. 7, electronic information 710 may comprise a data quality categorization 730 for the data set generated based on the data quality rating 720. The data quality categorization 730 may comprise or correspond to, for example, an alphabetic categorization level (e.g., "AAA"; "AA"; "A+"; "A"; "BBB"; "BB"; "BB+"; "B"; etc.); a numeric categorization level (e.g., "5,000"; "3,000"; "1,000"; "1", "2", "3"; etc.); an alphanumeric categorization level (e.g., "A2"; "3B"; "5K"; "1K"; "1st"; "2nd"; "3rd"; etc.); a metallic categorization level (e.g., "platinum"; "gold"; "silver"; "bronze"; etc.); a crystalline categorization level (e.g., "diamond"; "ruby"; "emerald"; "sapphire"; etc.); a crystalline categorization level (e.g., "diamond"; "ruby"; "emerald"; "sapphire"; etc.); an agricultural categorization level (e.g., "prime"; "choice"; "select"; "grade AA"; "grade A"; "grade B"; etc.); a graphic categorization level (e.g., five stars; three-and-a-half stars; three-out-of-five stars; zero-out-of-five stars; etc.); or any other categorization indicative of the level of quality of the data set.

As further shown in FIG. 7, electronic information 710 may comprise one or more data quality certifications 740 for the data set generated based on the data quality categorization 730. The one or more data quality certifications 740 may comprise or correspond to, for example, one or more certification flags (e.g., "certification=1" when a data is certified for a particular use or application; "certification=0" when the data set is not certified for a particular use or application); one or more certification images (e.g., icons, shields, seals, etc.); one or more textual certifications (e.g., "Certified"; "Not Certified"; "Certified AAA"; etc.); or any other certification indicating that the data set has been certified for use, certified for use with a particular application, or certified at a particular level of quality (e.g., based on the data quality categorization).

In some instances, the one or more data quality certifications 740 may comprise multiple data quality certifications 742A-742N for the data set based on different uses, deployments, or applications of the data set. For example, the one or more data quality certifications 740 may comprise a first data quality certification 742A for the data set based on a first use of the data set and a second data quality certification 742B for the data set based on a second use of the data set, and possibly other data quality certifications 742N for the data set based on additional uses of the data set, wherein the first use, the second use, and the additional uses are different. In one illustrative example where the data quality categorization 730 comprises or corresponds to the alphanumeric categorization level of "AA," the first data quality certification 742A may comprise a first flag, image, or text indicating that the data set is certified for the first use (e.g., a use that requires a data quality categorization level of "BBB" or higher for certification) while the second data quality certification 742B may comprise a second flag, image, or text indicating that the data set is not certified for the second use (e.g., a use that requires a data quality categorization level of "AAA" or higher for certification).

As further shown in FIG. 7, electronic information 710 may comprise other data quality data 750 for the data set generated based on any electronic information or data, or combination thereof, described herein. For example, the other data quality data 750 may comprise system-override data indicating pre-authorization of the data set by a system administrator or indicating that the data set is not authorized by a system administrator regardless of its certification or other apparent indicia of quality. In some instances, such as when the one or more data quality certifications 740 are configured to be stored as data set metadata in association with data set identification data indicative of an identity of the data set, the other data quality data 750 may comprise a linked list, struct, or other data structure that demonstrates the existence of an expressly inserted connection between the data set metadata and the data set identification data; or any combination thereof.

Figure 8:
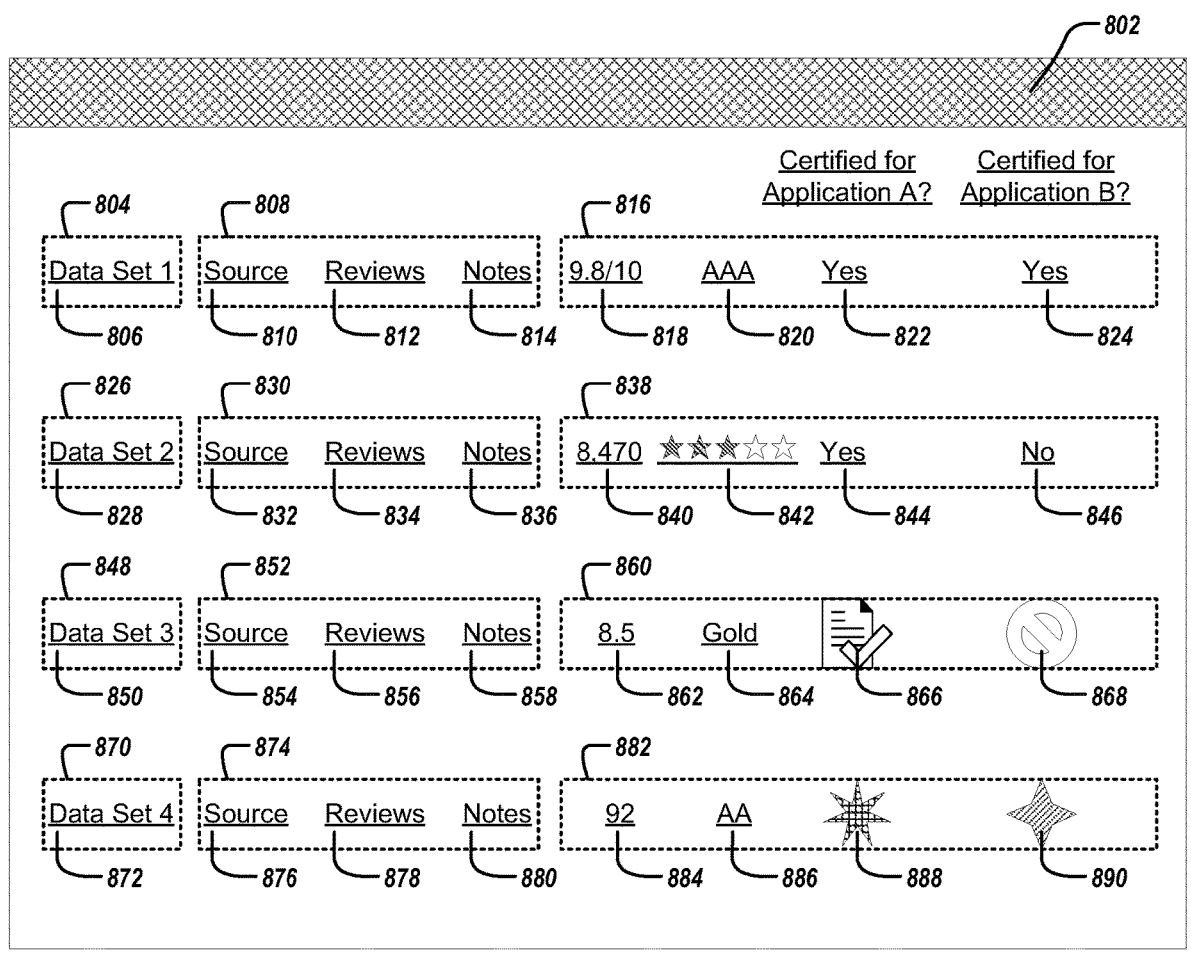
FIG. 8 illustrates an example user interface display screen in accordance with some example embodiments described herein.

FIG. 8 illustrates an example user interface display screen 800 in accordance with some example embodiments described herein. In some embodiments, generated user interface data may be configured to be displayed by a display device in display screen 800. As shown in FIG. 8, display screen 800 may comprise a header 802 for displaying any suitable information, such as an Internet Protocol (IP) address, a title, a source name (e.g., "Data Set Exchange"), or any combination thereof.

As further shown in FIG. 8, display screen 800 may comprise data set identification content 804 indicative of an identity of a first data set, 826 indicative of an identity of a second data set, 848 indicative of an identity of a third data set, and 870 indicative of an identity of a fourth data set (although it will be understood that there may be any number of data sets represented by the display screen 800). Data set identification content 804 may comprise, for example, a data set identification 806 configured to provide a pop up display screen comprising data set identification data for the first data set when clicked or selected by a user. Data set identification content 826 may comprise, for example, a data set identification 828 configured to provide a pop up display screen comprising data set identification data for the second data set when clicked or selected by a user. Data set identification content 848 may comprise, for example, a data set identification 850 configured to provide a pop up display screen comprising data set identification data for the third data set when clicked or selected by a user. Data set identification content 870 may comprise, for example, a data set identification 872 configured to provide a pop up display screen comprising data set identification data for the fourth data set when clicked or selected by a user.

As further shown in FIG. 8, display screen 800 may comprise data quality certification content 816 indicative of one or more of a data quality rating 818 for the first data set, a data quality categorization 820 for the first data set, a data quality certification 822 for a first use (e.g., "Application A") of the first data set, and a data quality certification 824 for a second use (e.g., "Application B") of the first data set. The display screen 800 may comprise data quality certification content 838 indicative of one or more of a data quality rating 840 for the second data set, a data quality categorization 842 for the second data set, a data quality certification 844 for a first use (e.g., "Application A") of the second data set, and a data quality certification 846 for a second use (e.g., "Application B") of the second data set. The display screen 800 may comprise data quality certification content 860 indicative of one or more of a data quality rating 862 for the third data set, a data quality categorization 864 for the third data set, a data quality certification 866 for a first use (e.g., "Application A") of the third data set, and a data quality certification 868 for a second use (e.g., "Application B") of the third data set. The display screen 800 may comprise data quality certification content 882 indicative of one or more of a data quality rating 884 for the fourth data set, a data quality categorization 886 for the fourth data set, a data quality certification 888 for a first use (e.g., "Application A") of the fourth data set, and a data quality certification 890 for a second use (e.g., "Application B") of the fourth data set. FIG. 8 illustrates a variety of different presentation formats for the data quality certification content referenced by components 816, 838, 860, and 882. Different formats have been utilized for different data sets to demonstrate the flexibility and variability of the user interfaces contemplated herein. Many embodiments will use a single presentation format consistently across all data sets, (although such uniformity is not necessary in all embodiments). One or more of the components 818, 820, 822, 824, 840, 842, 844, 846, 862, 864, 866, 868, 884, 886, 888, and 890 may configured to provide a pop up display screen comprising descriptions, additional information (e.g., how the components were generated, determined, or calculated), or other information for the respective data quality ratings, data quality categorizations, data quality certifications for the respective data sets when clicked or selected by a user.

As further shown in FIG. 8, display screen 800 may comprise data quality analysis content 808, 830, 852, and 874 respectively indicative of: one or more first portions 810, 832, 854, and 876 of the first electronic information comprising objective indicia of quality respectively associated with the first data set, the second data set, the third data set, and the fourth data set; one or more second portions 812, 834, 856, and 878 of the second electronic information comprising subjective indicia of quality respectively associated with the first data set, the second data set, the third data set, and the fourth data set; and one or more third portions 814, 836, 858, and 880 of the third electronic information comprising analytical indicia of quality (and, in some instances, outcome indicia of quality) respectively associated with the first data set, the second data set, the third data set, and the fourth data set. One or more of the components 810, 812, 814, 832, 834, 836, 854, 856, 858, 876, 878, and 880 may configured to provide a pop up display screen comprising descriptions, additional information (e.g., objective indicia of quality, subjective indicia of quality, outcome indicia of quality, analytical indicia of quality, etc.), or other information for the respective sources, reviews, analyses, or notes for the respective data sets when clicked or selected by a user.

Having described specific components of example devices involved in the present disclosure, example procedures for categorizing a data set are described below in connection with FIG. 9.

Example Operations for Categorizing a Data Set

Figure 9:
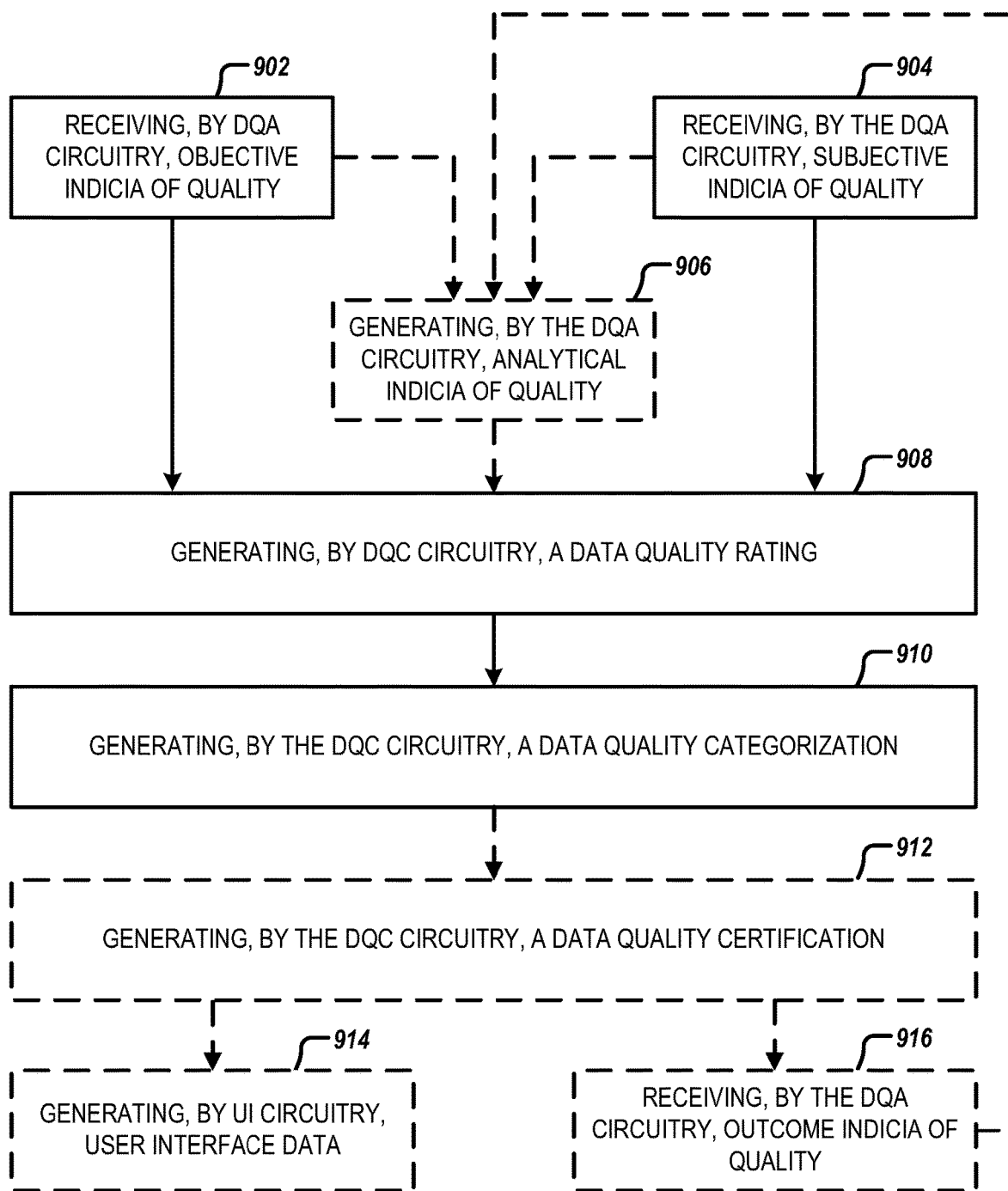
FIG. 9 illustrates an example flowchart for categorizing a data set in accordance with some example embodiments described herein.

Turning to FIG. 9, an example flowchart 900 is illustrated that contains example operations for categorizing a data set according to an example embodiment. The operations illustrated in FIG. 9 may, for example, be performed by one or more components described with reference to data certification system 102 shown in FIG. 1, by a data set device 110 or a user device 112 in communication with data certification system 102, by apparatus 200 shown in FIG. 2, or by any combination thereof. In some embodiments, the various operations described in connection with FIG. 9 may be performed by the apparatus 200 by or through the use of one or more of processing circuitry 202, memory 204, input-output circuitry 206, communications circuitry 208, DQA circuitry 210, DQC circuitry 212, DCS circuitry 214, UI circuitry 216, any other suitable circuitry, and any combination thereof.

As shown by operation 902, the apparatus 200 includes means, such as DQA circuitry 210 described with reference to FIG. 2 or the like, for receiving first electronic information comprising objective indicia of quality associated with a data set. The objective indicia of quality may be any suitable objective indicia of quality, such as one or more portions of the objective indicia of quality 310 described with reference to FIG. 3. For example, the objective indicia of quality associated with the data set may comprise origin data indicative of a source of the data set, attestation data indicative of an attestation associated with the data set, freshness data indicative of the freshness of the data set, coherence data indicative of the coherence of the data set, any other suitable data or electronic information, or any combination thereof. In some embodiments, the DQA circuitry may utilize means, such as communications circuitry, for receiving the first electronic information. In some embodiments, the apparatus 200 may receive the first electronic information from a data set device (e.g., data set device 110) or a user device (e.g., user device 112), as described in more detail with reference to FIGS. 1 and 2. For example, the data set device or the user device may transmit the first electronic information to the DQA circuitry of apparatus 200. In other embodiments, the apparatus 200 may receive the first electronic information from the memory 204 of apparatus 200. In still other embodiments, the apparatus 200 may include means, such as processor 202 or the like, for generating the objective indicia of quality based on analysis of the data set itself (e.g., by determining coherence of the data from analysis of data values contained in the data set).

As shown by operation 904, the apparatus 200 includes means, such as the DQA circuitry 210 or the like, for receiving second electronic information comprising subjective indicia of quality associated with a data set. The subjective indicia of quality may be any suitable subjective indicia of quality, such as one or more portions of the subjective indicia of quality 410 described with reference to FIG. 4. For example, the subjective indicia of quality associated with the data set may comprise subjective evaluation data comprising one or more subjective evaluations of the data set provided by one or more users, any other suitable data or electronic information, or any combination thereof. In some embodiments, the DQA circuitry may utilize means, such as communications circuitry, for receiving the second electronic information. In some embodiments, the apparatus 200 may receive the second electronic information from a data set device (e.g., data set device 110) or a user device (e.g., user device 112), as described in more detail with reference to FIGS. 1 and 2. For example, the data set device or the user device may transmit the second electronic information to the DQA circuitry of apparatus 200. In other embodiments, the apparatus 200 may receive the second electronic information from the memory 204 of apparatus 200.

Optionally, as shown by operation 906, the apparatus 200 includes means, such as the DQA circuitry or the like, for generating third electronic information comprising analytical indicia of quality associated with the data set based on the first electronic information and the second electronic information. For example, the DQA circuitry 210 may generate one or more portions of analytical indicia of quality 610 described with reference to FIG. 6 based on one or more portions of objective indicia of quality 310 described with reference to FIG. 3 and one or more portions of subjective indicia of quality 410 described with reference to FIG. 4. The analytical indicia of quality may be any suitable analytical indicia of quality, such as one or more portions of the analytical indicia of quality 610 described with reference to FIG. 6. For example, the analytical indicia of quality associated with the data set may comprise: analytical indicia of quality based on objective indicia of quality associated with the data set; analytical indicia of quality based on subjective indicia of quality associated with the data set; analytical indicia of quality based on one or more changes in the data set; analytical indicia of quality based on outcome indicia of quality associated with the data set; any other suitable data or electronic information; or any combination thereof.

Optionally, as shown by operation 906, the apparatus 200 may include means, such as the DQA circuitry or the like, for generating the third electronic information comprising the analytical indicia of quality associated with the data set further based on fourth electronic information comprising outcome indicia of quality associated with the data set. For example, the DQA circuitry 210 may generate one or more portions of analytical indicia of quality 610 described with reference to FIG. 6 further based on one or more portions of outcome indicia of quality 510 described with reference to FIG. 5. The DQA circuitry or the like may further receive fourth electronic information comprising outcome indicia of quality as described in more detail with reference to optional operation 916, and in optional operation 906, the DQA circuitry may generate the analytical indicia of quality based in part on that fourth electronic information.

As shown by operation 908, the apparatus 200 includes means, such as DQC circuitry 212 described with reference to FIG. 2 or the like, for generating a data quality rating for the data set based on the first electronic information, the second electronic information, and the generated third electronic information. The data quality rating for the data set may be any suitable data quality rating, such as data quality rating 720 described with reference to FIG. 7. For example, the apparatus 200 may comprise DQC circuitry 212 for generating data quality rating 720 described with reference to FIG. 7 based on one or more portions of objective indicia of quality 310 described with reference to FIG. 3, subjective indicia of quality 410 described with reference to FIG. 4, and analytical indicia of quality 610 described with reference to FIG. 6. In some embodiments, the DQA circuitry may utilize means, such as communications circuitry, for receiving the first electronic information, the second electronic information, and the third electronic information from the DQA circuitry. In some embodiments, the DQC circuitry may be in communication with the DQA circuitry via the processing circuitry 202 or communications circuitry 208 of apparatus 200. In some embodiments, the DQC circuitry 212 may retrieve business rules stored in a memory (e.g., memory 204) that assign weights to each of the objective, subjective, and analytical indicia of quality. Subsequently, the DQC circuitry 212 may apply the weights assigned to the values received for each of the objective, subjective, and analytical indicia of quality, and may then combine the weighted values for each indicia of quality into a single score comprising the data quality rating. It will be understood that the business rules may further comprise instructions for translating qualitative values comprising any of the objective, subjective, or analytical indicia of quality into quantitative values amenable to subsequent weighting and use in the generation of the data quality rating. For instance, if the subjective indicia of quality comprises subjective reviews 426 or other subjective evaluations 428 (and not explicit subjective ratings), then the business rules may provide a procedure for the DQC circuitry 212 to convert the reviews 246 or other subjective evaluations 428 into a quantitative metric (e.g., through sentiment analysis of the subjective reviews or evaluations).

As shown by operation 910, the apparatus 200 includes means, such as the DQC circuitry or the like, for generating a data quality categorization for the data set based on the generated data quality rating. The data quality categorization for the data set may be any suitable data quality categorization, such as data quality categorization 730 described with reference to FIG. 7. For example, the apparatus 200 may comprise DQC circuitry 212 for generating data quality categorization 730 based on data quality rating 720 described with reference to FIG. 7. To generate the data quality categorization for the data set, the DQC circuitry 212 may identify absolute threshold criteria for the data quality rating to correspond to each data quality categorization of the data (e.g., a data quality rating above some predetermined threshold A and below some other predetermined threshold B demonstrates that the data quality rating corresponds to a particular data quality categorization, whereas a data quality rating within boundaries set by predetermined thresholds C and D demonstrate that the data quality rating corresponds to a different particular data quality categorization). In some embodiments, the thresholds for each particular data quality categorization may be different for different uses of the data. Moreover, in some embodiments, there may be reasons to override the generated data quality rating. For instance, in an instance in which a human advisor with relevant expertise disagrees with the suggested data quality categorization, user input may be used to provide a vote of no confidence in the generated data quality categorization or to override the generated data quality categorization with a different data quality categorization.

Optionally, as shown by operation 912, the apparatus 200 may include means, such as the DQC circuitry or the like, for generating a data quality certification for the data set based on the generated data quality categorization. The data quality certification for the data set may be any suitable data quality certification, such as the one or more data quality certifications 740 described with reference to FIG. 7. For example, the apparatus 200 may comprise DQC circuitry 212 for generating one or more of one or more data quality certifications 740 based on data quality categorization 730 described with reference to FIG. 7.

Optionally, as shown by operation 914, the apparatus 200 may include means, such as UI circuitry 216 described with reference to FIG. 2 or the like, for generating user interface data configured to be displayed by a display device based on one or more of the first electronic information, the second electronic information, the generated third electronic information, the fourth electronic information, the generated data quality rating, the generated data quality categorization, and the generated data quality certification. The user interface data may be any suitable user interface data, such as one or more portions of the user interface data configured for display in display screen 800 described with reference to FIG. 8. In some instances, the generated user interface data may comprise data set identification content, data quality certification content, data quality analysis content, any other suitable data or electronic information, or any combination thereof. For example, the apparatus 200 may comprise UI circuitry 216 for generating user interface data configured to be displayed by a display device (e.g., data set device 110 or user device 112 described with reference to FIG. 1, input-output circuitry 206 of apparatus 200 described with reference to FIG. 2) in display screen 800 described with reference to FIG. 8. In some embodiments, the UI circuitry may utilize means, such as communications circuitry, for receiving the first electronic information, the second electronic information, the third electronic information, and the fourth electronic information, the data quality rating, the data quality categorization, and the data quality certification. In some embodiments, the UI circuitry may be in communication with the DQA circuitry, the DQC circuitry, or both via the processing circuitry 202, communications circuitry 208, or both.

In some embodiments, the apparatus 200 further includes means, such as the UI circuitry or the like, for transmitting the user interface data to a display device. In embodiments in which the user directly interacts with the apparatus 200, the UI circuitry may transmit the user interface data by producing a graphic, audio, or multimedia output of the user interface data via input-output circuitry 206. In embodiments in which the user does not directly interact with the apparatus 200 (e.g., the apparatus 200 comprises a data certification system 102, but the user interacts with a data set device 110 or a user device 112 that is in communication with the data certification system 102), the UI circuitry may utilize means, such as communications circuitry, for transmitting the user interface data. For example, the UI circuitry may transmit the user interface data to a data set device 110 or a user device 112 for graphic, audio, or multimedia output via input-output circuitry of the data set device 110 or the user device 112.

Optionally, as shown by operation 916, the apparatus 200 includes means, such as the DQA circuitry or the like, for receiving fourth electronic information comprising outcome indicia of quality associated with a data set. The outcome indicia of quality may be any suitable outcome indicia of quality, such as one or more portions of the outcome indicia of quality 510 described with reference to FIG. 5. For example, the outcome indicia of quality associated with the data set may comprise: objective outcome evaluation data comprising one or more objective evaluations of the outcome of the use of the data set; subjective outcome evaluation data comprising one or more subjective evaluations of the outcome of the use of the data set provided by one or more users; any other suitable data or electronic information; or any combination thereof. In some embodiments, the apparatus may include means, such as the DQA circuitry or the like, for generating updated, revised, or confirmed third electronic information further based on fourth electronic information comprising outcome indicia of quality associated with the data set. For example, the apparatus 200 may comprise DQA circuitry 210 for generating, at a subsequently performed operation 906, updated analytical indicia of quality 610 described with reference to FIG. 6 based on outcome indicia of quality 510 described with reference to FIG. 5. In some embodiments, the DQA circuitry may utilize means, such as communications circuitry, for receiving the fourth electronic information. In some embodiments, the apparatus 200 may receive the fourth electronic information from a data set device (e.g., data set device 110) or a user device (e.g., user device 112), as described in more detail with reference to FIGS. 1 and 2. For example, the data set device or the user device may transmit the fourth electronic information to the DQA circuitry of apparatus 200. In other embodiments, the apparatus 200 may receive the fourth electronic information from the memory 204 of apparatus 200.

In some embodiments, operations 902, 904, 906, 908, 910, 912, 914, and 916 may not necessarily occur in the order depicted in FIG. 9, and in some cases one or more of the operations depicted in FIG. 9 may occur substantially simultaneously, or additional steps may be involved before, after, or between any of the operations shown in FIG. 9.

As noted above, methods, apparatuses, systems, and computer program products are described herein that provide for categorizing a data set. By doing so, users are able to avoid the traditional problems surrounding determination of the quality of data sets. For instance, through performance of the above operations, a user can avoid having to rely on trial and error or ad hoc correspondence with other users to identify the quality of a data set. Instead, example embodiments described herein facilitate the generation of rigorous data quality analysis of data sets sourced from both objective and subjective input. Moreover, in some embodiments, this data quality analysis is based in part outcome-based data stemming from uses of those data sets.

FIG. 9 thus illustrates a flowchart describing the operation of various systems (e.g., data certification system 102 described with reference to FIG. 1), apparatuses (e.g., apparatus 200 described with reference to FIG. 2), methods, and computer program products according to example embodiments contemplated herein. It will be understood that each operation of the flowchart, and combinations of operations in the flowchart, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIG. 9 support combinations of means for performing the specified functions and combinations of operations for performing the specified functions. It will be understood that one or more operations of the flowchart, and combinations of operations in the flowchart, can be implemented by special purpose hardware-based computer systems which perform the specified functions, or combinations of special purpose hardware and computer instructions.

Use Case

Having described example embodiments in general terms, the following example embodiments are provided to further illustrate a use case of some example embodiments. In some instances, the following example embodiments provide examples of how the data certification system disclosed herein may generate analytical indicia of quality based on received objective indicia of quality and received subjective indicia of quality. In some instances, the following example embodiments provide examples of the ways in which the data certification system disclosed herein may generate a data quality rating for a data set based on received objective indicia of quality, received subjective indicia of quality, and generated analytical indicia of quality. In some instances, the following example embodiments provide examples of the ways in which the data certification system disclosed herein may generate a data quality categorization for the data set based on the generated data quality rating. In some instances, the following example embodiments provide examples of the ways in which the data certification system recited herein may generate a data quality certification for the data set based on the generated data quality categorization. In some instances, the following example embodiments provide examples of different uses of data sets and the data quality categorizations those uses may require for certification by the data certification system disclosed herein.

"Share of Asset Wallet" Use Case

"Share of Asset Wallet" is an illustrative example use case wherein the data certification system disclosed herein may generate an advantageous data quality rating using both objective indicia of quality and subjective indicia of quality. "Share of Asset Wallet" or "wallet share" is a ratio metric that may be used at an individual level and in aggregate. The wallet share ratio comprises a numerator indicative of the total assets held in accounts at a financial institution. The wallet share ratio further comprises a denominator indicative of an estimate of total assets available to be invested at any financial institution. The data certification system may use the wallet share ratio at an aggregate level across a retail segment to estimate a realistic level of opportunity for meeting unmet financial needs for the group. Alternatively, the data certification system may use the wallet share ratio at an individual level to estimate a realistic level of opportunity for meeting unmet financial needs in order to prioritize communication, refine messaging, or both.

The objective indicia of quality for the "Share of Asset Wallet" use case may comprise both known and estimated data. For example, changes in the wallet share ratio may be driven artificially by changes in the denominator that are not relevant to wallet share. The data certification system may measure and flag these changes. In another example, the estimated data may correspond to the denominator and may be associated with a household age and a geographic area, such as a zone improvement plan (ZIP) code, a ZIP+4 code, or a geographic area defined by global positioning system coordinates. In some instances, the estimated data may have been modeled by a third party.

The estimated data may have a number of problems relating to data quality. For example, the denominator may be lower than total assets held at the financial institution and thus result in a wallet share ratio of greater than one hundred percent. In another example, the estimated data may change if the customer moves to a different geographic area (e.g., a different ZIP+4 code). In another example, the estimated data may be an average of the modeled assets of five to seven households in a particular geographic area (e.g., ZIP+4 code) so the wallet share ratio also may fluctuate based on the activity of neighbors. In another example, the total asset estimates may be affected by estimation process errors by the financial institution or a third party related to the definition of the geographic area or the households associated with the geographic area.

To improve data quality, the data certification system may use business rules to flag wallet share ratios with greater than one hundred percent wallet share. The data certification system also may flag wallet share ratios that change beyond a predetermined threshold when the denominator data is refreshed and the numerator is held constant, which would represent artificial changes driven by the third party asset estimates. The data certification system may perform these operations analytically by applying the numerator and denominator updates separately and developing rules for which changes are artificial versus real, or significant versus insignificant. In some instances, the data certification system may flag wallet share ratios as higher quality changes in the wallet share ratio resulting from changes in the numerator and moderated by information about the nature of the changes in the form of business rules or an algorithm derived analytically. For example, the data certification system may determine that large movements of cash into or out of certain types of investment accounts may mean something different to the interpretation of the wallet share ratio than gradual increases or decreases to otherwise stable accounts over time.

The subjective indicia of quality for the "Share of Asset Wallet" use case may comprise subjective evaluations and ratings provided by financial institution team members with more insight into the denominator than the original source of the data, and the data certification system may capture this wisdom. In some embodiments, the wallet share ratio is more appropriately used for large populations where individual errors become negligible (e.g., "wash out"). The wallet share ratio also has a potential application as a data point for customer-facing team members who may want to start conversations about the services and products offered by their company. To be useful this manner, the data certification system may provide a way for those team members to rate the quality of the data set based on their first-hand knowledge of customers or their experience using the wallet share ratio. This implementation provides multiple advantages. For instance, flags of objective quality can help these team members understand which customers' data is more likely reliable, helping team members to refine their conversational approach and avoid wasting customers' time. Additionally, by broad participation in this process, with a critical mass of subjective quality feedback, the data certification system may be able to create analytic indicia of quality for use in building algorithms that improve wallet share estimates in the first place.

In some instances, any entity may purchase the denominator (e.g., the total wallet estimates) made available by the third party. That entity may have its own estimate of the numerator. Competitive differences in the quality of the wallet share ratio data may relate to factors irrelevant to the application, such as: householding and the ability of using denominator estimates effectively; and business practice rules (e.g., not using estimates in marketing and sales outreach programs). In some instances, differentiation in wallet share ratio quality may be driven by its adoption and the analytic strength of the rules that measure its quality.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the supply management system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A computing system for categorizing a data set, the computing system comprising:
    data quality analysis (DQA) circuitry comprising a processor and a memory storing executable instructions that, when executed by the processor, cause the DQA circuitry to:
        receive first electronic information comprising objective indicia of quality associated with the data set, wherein the objective indicia of quality comprise origin data and attestation data, and wherein the origin data is indicative of a source of the data set,
        receive second electronic information comprising subjective indicia of quality associated with the data set,
        generate, based on the first electronic information and the second electronic information, third electronic information comprising analytical indicia of quality associated with the data set,
        transmit the first electronic information, the second electronic information, and the third electronic information,
        receive fourth electronic information comprising outcome indicia of quality associated with the data set, wherein the outcome indicia of quality associated with the data set comprises objective outcome evaluation data and subjective outcome evaluation data, wherein the objective outcome evaluation data comprises one or more objective evaluations of outcome of use of the data set and the subjective outcome evaluation data comprises one or more subjective evaluations of use of the data set, and
        regenerate the third electronic information further based on the fourth electronic information; and
    data quality certification (DQC) circuitry comprising a processor and a memory storing executable instructions that, when executed by the processor, cause the DQC circuitry to:
        receive the first electronic information, the second electronic information, and the third electronic information,
        generate a data quality rating for the data set based on the first electronic information, the second electronic information, and the third electronic information, and
        use a feedback loop to update the data quality rating for the data set, wherein the feedback loop is based on an evaluation of the objective indicia of quality.

2. The computing system of claim 1, wherein the subjective indicia of quality comprise subjective evaluation data comprising one or more subjective evaluations of the data set provided by one or more users.

3. The computing system of claim 2, wherein the DQA circuitry is further configured to:
    generate, based on the origin data, an origin reliability rating for the data set;
    generate, based on the subjective evaluation data, one or more subjective evaluation reliability ratings for the one or more subjective evaluations; and
    generate the third electronic information further based on the origin reliability rating and the one or more subjective evaluation reliability ratings.

4. The computing system of claim 1, wherein the DQA circuitry is further configured to:
    generate variance data indicative of one or more changes in the data set between a first time and a second time different from the first time;
    generate a variance rating based on the variance data; and
    generate the third electronic information further based on the variance rating.

5. The computing system of claim 1, wherein the DQC circuitry is further configured to:
    generate a data quality categorization for the data set based on the data quality rating; and
    generate a data quality certification for the data set based on the data quality categorization,
    wherein the computing system further comprises data certification storage (DCS) circuitry in communication with the DQC circuitry and configured to store the data quality certification as data set metadata in association with data set identification data indicative of an identity of the data set.

6. The computing system of claim 5,
    wherein the computing system further comprises user interface (UI) circuitry comprising a processor and a memory storing executable instructions that, when executed by the processor, cause the UI circuitry to:
    receive the data quality rating, the data quality categorization, and the data quality certification;

generate data set identification content indicative of an identity of the data set;

generate data quality certification content indicative of one or more of the data quality rating, the data quality categorization, and the data quality certification;

generate user interface data configured to be displayed by a display device; and transmit the user interface data to the display device, wherein the user interface data comprises the data set identification content and the data quality certification content.

7. The computing system of claim 6, wherein the UI circuitry is further configured to:

receive the first electronic information, the second electronic information, and the third electronic information; and generate data quality analysis content indicative of one or more first portions of the first electronic information, one or more second portions of the second electronic information, one or more third portions of the third electronic information, or a combination thereof, wherein the user interface data comprises the generated data quality analysis content.

8. The computing system of claim 1, wherein the objective indicia of quality comprise one or both of freshness data and coherence data, wherein the freshness data is indicative of a freshness of the data set, and wherein the coherence data is indicative of coherence of the data set.

9. The computing system of claim 1, wherein the DQA circuitry is further configured to:

use the feedback loop to update the data quality rating for the data set by applying a second-order evaluation of sources of the objective indicia of quality and subjective indicia of quality associated with the data set.

10. The computing system of claim 1, wherein the feedback loop connects outcomes stemming from use of the data set as input to update the data quality rating for the data set.

11. A method for categorizing a data set, the method comprising:

receiving, by data quality analysis (DQA) circuitry, first electronic information comprising objective indicia of quality associated with the data set, wherein the objective indicia of quality comprises origin data and attestation data, and wherein the origin data is indicative of a source of the data set;

receiving, by the DQA circuitry, second electronic information comprising subjective indicia of quality associated with the data set;

generating, by the DQA circuitry, third electronic information comprising analytical indicia of quality associated with the data set based on the first electronic information and the second electronic information;

transmitting, by the DQA circuitry to data quality certification (DQC) circuitry in communication with the DQA circuitry, the first electronic information, the second electronic information, and the third electronic information;

receiving, by the DQA circuitry, fourth electronic information comprising outcome indicia of quality associated with the data set, wherein the outcome indicia of quality associated with the data set comprises objective outcome evaluation data and subjective outcome evaluation data, wherein the objective outcome evaluation data comprises one or more objective evaluations of outcome of use of the data set and the subjective outcome evaluation data comprises one or more subjective evaluations of use of the data set;

regenerating, by the DQA circuitry, the third electronic information further based on the fourth electronic information;

generating, by the DQC circuitry, a data quality rating for the data set based on the first electronic information, the second electronic information, and the third electronic information; and using, by the DQA circuitry, a feedback loop to update the data quality rating for the data set, wherein the feedback loop is based on an evaluation of the objective indicia of quality.

12. The method of claim 11, wherein the receiving the second electronic information comprises receiving, by the DQA circuitry, subjective evaluation data comprising one or more subjective evaluations of the data set provided by one or more users.

13. The method of claim 12, further comprising:

generating, by the DQA circuitry, an origin reliability rating for the data set based on the origin data;

generating, by the DQA circuitry, one or more subjective evaluation reliability ratings for the one or more subjective evaluations based on the subjective evaluation data; and generating, by the DQA circuitry, the third electronic information further based on the origin reliability rating and the one or more subjective evaluation reliability ratings.

14. The method of claim 11, further comprising:

generating, by the DQA circuitry, variance data indicative of one or more changes in the data set between a first time and a second time different from the first time;

generating, by the DQA circuitry, a variance rating based on variance data; and generating, by the DQA circuitry, the third electronic information further based on the variance rating.

15. The method of claim 11, further comprising:

generating, by the DQC circuitry, a data quality categorization for the data set based on the data quality rating;

generating, by the DQC circuitry, a data quality certification for the data set based on the data quality categorization; and storing, by data certification storage (DCS) circuitry in communication with the DQC circuitry, the data quality certification as data set metadata in association with data set identification data indicative of an identity of the data set.

16. The method of claim 15, further comprising:

receiving, by user interface (UI) circuitry user interface (UI), the data quality rating, the data quality categorization, and the data quality certification;

generating, by the UI circuitry, data set identification content indicative of an identity of the data set;

generating, by the UI circuitry, data quality certification content indicative of one or more of the data quality rating, the data quality categorization, and the data quality certification;

generating, by the UI circuitry, user interface data configured to be displayed by a display device; and transmitting, by the UI circuitry, the user interface data to the display device, wherein the user interface data comprises the data set identification content and the data quality certification content.

17. The method of claim 16, further comprising:

receiving, by the UI circuitry, the first electronic information, the second electronic information, and the third electronic information; and generating, by the UI circuitry, data quality analysis content indicative of one or more first portions of the first electronic information, one or more second portions of the second electronic information, one or more third portions of the third electronic information, or a combination thereof, wherein the user interface data comprises the generated data quality analysis content.

18. The method of claim 11, further comprising:

using the feedback loop to update the data quality rating for the data set by applying a second-order evaluation of sources of the objective indicia of quality and subjective indicia of quality associated with the data set.

19. A computer program product for categorizing a data set, the computer program product comprising at least one non-transitory computer-readable storage medium storing program instructions that, when executed, cause a computing system to:

receive first electronic information comprising objective indicia of quality associated with the data set, wherein the objective indicia of quality comprise origin data and attestation data, and wherein the origin data is indicative of a source of the data set;

receive second electronic information comprising subjective indicia of quality associated with the data set;

generate, based on the first electronic information and the second electronic information, third electronic information comprising analytical indicia of quality associated with the data set;

receive fourth electronic information comprising outcome indicia of quality associated with the data set, wherein the outcome indicia of quality associated with the data set comprises objective outcome evaluation data and subjective outcome evaluation data, wherein the objective outcome evaluation data comprises one or more objective evaluations of outcome of use of the data set and the subjective outcome evaluation data comprises one or more subjective evaluations of use of the data set, regenerate the third electronic information further based on the fourth electronic information;

generate a data quality rating for the data set based on the first electronic information, the second electronic information, and the third electronic information; and using a feedback loop to update the data quality rating for the data set, wherein the feedback loop is based on an evaluation of the objective indicia of quality.

20. The computer program product of claim 19, wherein the program instructions, when executed, further cause the computing system to:

generate data set identification content indicative of an identity of the data set;

generate data quality analysis content based on one or more first portions of the first electronic information, one or more second portions of the second electronic information, one or more third portions of the third electronic information, or a combination thereof;

generate a data quality categorization for the data set based on the data quality rating;

generate a data quality certification for the data set based on the data quality categorization;

generate data quality certification content based on one or more of the data quality rating, the data quality categorization, and the data quality certification;

generate user interface data configured to be displayed by a display device; and cause transmission of the user interface data to the display device wherein the user interface data comprises the data set identification content and the data quality certification content.

\* \* \* \* \*